United States Patent
Ahn et al.

(10) Patent No.: US 9,638,541 B2
(45) Date of Patent: May 2, 2017

(54) METHOD FOR CALCULATING PATHS, METHOD FOR OBTAINING PATHS AS WELL AS TERMINAL FOR SAME

(71) Applicant: LG ELECTRONICS INC., Seoul (KR)

(72) Inventors: Hongbeom Ahn, Anyang-si (KR); Younsung Chu, Anyang-si (KR); Jaehyuk Choi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 58 days.

(21) Appl. No.: 14/362,084

(22) PCT Filed: Oct. 15, 2012

(86) PCT No.: PCT/KR2012/008366
§ 371 (c)(1),
(2) Date: May 30, 2014

(87) PCT Pub. No.: WO2013/094865
PCT Pub. Date: Jun. 27, 2013

(65) Prior Publication Data
US 2014/0343838 A1    Nov. 20, 2014

Related U.S. Application Data

(60) Provisional application No. 61/577,079, filed on Dec. 18, 2011, provisional application No. 61/577,614, (Continued)

(51) Int. Cl.
G09B 29/00    (2006.01)
G08G 1/0968    (2006.01)
(Continued)

(52) U.S. Cl.
CPC ..... *G01C 21/3691* (2013.01); *G01C 21/3492* (2013.01); *G08G 1/096827* (2013.01); *G08G 1/096844* (2013.01); *G09B 29/007* (2013.01)

(58) Field of Classification Search
CPC ......... G01C 21/3691; G08G 1/096733; G08G 1/09675; G08G 1/096741;
(Continued)

(56) References Cited

U.S. PATENT DOCUMENTS 6,266,608 B1 *  7/2001  Pertz .............................. 701/408
6,324,467 B1 * 11/2001  Machii et al. ................. 701/420
(Continued)

FOREIGN PATENT DOCUMENTS

DE    102008037287 A1 *  5/2009 ............. G01C 21/26
EP       1801764 B1 *  6/2010
(Continued)

*Primary Examiner* — Dale Moyer
(74) *Attorney, Agent, or Firm* — Birch, Stewart, Kolasch & Birch, LLP

(57) ABSTRACT

The present invention relates to a method for calculating trip paths determined by a departure point and a target point by using traffic information in a terminal. The method includes the steps of: requesting traffic information related to a trip from a server; receiving the traffic information related to the trip from the server; and calculating the paths by using the received traffic information, wherein the received traffic information includes traffic events corresponding to information on disturbances in the traffic flow in an area or the path related to the trip, and performance parameters corresponding to information on traffic flow in a road segment within a constant radius from the departure point, and wherein the performance parameters can be received from the server in the case where there is congestion heavier than a predetermined level within a constant radius from the departure point.

5 Claims, 14 Drawing Sheets

Related U.S. Application Data filed on Dec. 19, 2011, provisional application No. 61/599,943, filed on Feb. 17, 2012, provisional application No. 61/620,992, filed on Apr. 6, 2012, provisional application No. 61/623,577, filed on Apr. 13, 2012.

(51) Int. Cl.
*G01C 21/36* (2006.01)
*G01C 21/34* (2006.01)
*G01C 21/00* (2006.01)

(58) Field of Classification Search
CPC ........... G08G 1/096775; G08G 1/0968; G08G 1/096805; G08G 1/096811; G08G 1/096816; G08G 1/096822; G08G 1/096827; G08G 1/096833; G08G 1/096844; G08G 1/096838; G08G 1/096855; G08G 1/096866; B60W 2250/20
See application file for complete search history.

(56) References Cited

U.S. PATENT DOCUMENTS

| | | | |
|---|---|---|---|
| 7,072,676 B1 * | 7/2006 | Hessing | G01C 21/26 370/242 |
| 2001/0037305 A1 * | 11/2001 | Mochizuki | G08G 1/096811 705/52 |
| 2002/0173905 A1 * | 11/2002 | Jin | G01C 21/20 701/408 |
| 2004/0236507 A1 * | 11/2004 | Maruyama | G01C 21/3626 701/437 |
| 2005/0071077 A1 * | 3/2005 | Kadono et al. | 701/201 |
| 2005/0131628 A1 * | 6/2005 | Peeters | G01C 21/3415 701/468 |
| 2006/0063559 A1 * | 3/2006 | Fruit et al. | 455/552.1 |
| 2006/0080029 A1 * | 4/2006 | Kodani | G01C 21/32 701/420 |
| 2006/0178817 A1 * | 8/2006 | Suzuki | G01C 21/20 701/420 |
| 2007/0078597 A1 * | 4/2007 | Kotzin | 701/209 |
| 2008/0183380 A1 * | 7/2008 | Blackwood | G01C 21/26 701/420 |
| 2012/0116658 A1 * | 5/2012 | Lee et al. | 701/117 |
| 2014/0257695 A1 * | 9/2014 | Annapureddy | G01C 21/00 701/537 |

FOREIGN PATENT DOCUMENTS

| | | |
|---|---|---|
| EP | 1645849 B1 * | 12/2014 |
| JP | 2003-106857 A | 4/2003 |
| JP | 2003-194561 A | 7/2003 |
| JP | 2003-214868 A | 7/2003 |
| JP | 2003-308597 A | 10/2003 |

* cited by examiner

METHOD FOR CALCULATING PATHS, METHOD FOR OBTAINING PATHS AS WELL AS TERMINAL FOR SAME

CROSS REFERENCE TO RELATED APPLICATIONS

This non-provisional application is a National Stage entry under U.S.C. §371 of International Application No. PCT/KR2012/008366 filed on Oct. 15, 2012, which claims the benefit of U.S. Provisional Application No. 61/577,079 filed on Dec. 18, 2011, 61/577,614 filed on Dec. 19, 2011, 61/599,943 filed on Feb. 17, 2012, 61/620,992 filed on Apr. 6, 2012, 61/623,577 filed on Apr. 13, 2012. The entire contents of all of the above applications are hereby incorporated by reference.

TECHNICAL FIELD

The present invention relates to a method for calculating a route in a terminal, a method for acquiring a route in a terminal, or a terminal for the same, and more particularly, to a method for calculating a route using information received from a server or a terminal for the same, and a method for acquiring a calculated route from a server or a terminal for the same.

BACKGROUND ART

Conventionally, a navigation terminal detects its current location, that is, an origin of a trip through a Global Positioning System (GPS) connection, receives information about a destination of the trip from a user, and internally calculates a route based on the origin and the destination. Along with the recent proliferation and increased performance of smartphones, services have become popular, in which a traffic and route information providing server provides route information, real-time traffic information related to routes, and other various information to Personal Navigation Devices (PNDs) over a mobile communication network.

Particularly in the situation where various navigation services are available, the Open Mobile Alliance (OMA) standardization organization is working on standardization of Dynamic Navigation Enabler (DynNav) that provides real-time traffic information by Peer to Peer (P2P) communication through an Internet Protocol (IP)-based network of a mobile communication network or a wireless network, rather than Traffic Protocol Expert Group (TPEG) information is transmitted over a Digital Multimedia Broadcasting (DMB) network that provides information in a broadcast signal. The standard considers a navigation terminal and a service type largely in two ways for a smartphone.

First, a traffic and route information providing server performs complex route computation, instead of a navigation application loaded in a smartphone, and indicates a calculated route to the smartphone. Second, owing to the improved performance of a smartphone, an application loaded in the smartphone performs or a navigation terminal equipped with a mobile communication modem performs route computation. In this case, the traffic and route information providing server does not provide route information. Rather, once the terminal registers a calculated route to the server, the terminal can receive from the server only real-time traffic information related to the registered route in a customized manner by IP-based P2P communication, not in a conventional broadcast signal.

FIG. 1 illustrates Navigation Device (ND) types. NDs may be classified into a type 110 that additionally provides TPEG-based traffic information transmitted through a broadcasting network such as a DMB network, a type 120 that additionally provides traffic information in an IP-based manner, for example, over a mobile communication network or a Wireless Fidelity (Wi-Fi) network, and a standalone type 130 that tracks the location of a vehicle through a GPS connection without connecting to other communication media, generates route information, and provides the route information.

DynNav under standardization in the OMA LOC WG belongs to the type 120 that provides IP-based traffic information, specifically by P2P communication. The following two types of NDs are defined in DynNav.

1. Smart ND: a device that can calculate a route on its own and thus requests only real-time traffic information to a DynNav server without receiving route information from the DynNav server.

2. Lightweight ND: a device that cannot calculate a route on its own and thus requests all real-time traffic information including route information to a DynNav server.

Since traffic information is requested and provided in a RESTful-based manner in a conventional DynNav system, the following route information formats are used and each information format can be defined by XML Schema Definition (XSD).

1) Trip Structure: a terminal initially acquires basic information such as an origin and a destination from a user, for route setting, and provides the acquired information to a server. The trip structure includes subsets corresponding to a plurality of route structures.

TABLE 1

| Element | Type | Optional | Description |
|---|---|---|---|
| originWGS84 | Location_Point | Yes | Location information about an origin represented by WGS84 (Location_Point structure is defined in tpeg-locML [TTI LOC]. At least one element originWGS84 or originAddress MUST be specified.) |
| originAddress | Civic Location Format | Yes | Location information about the origin represented as a civic location (Civic Location Format is defined by IETF [RFC 5139]. At least one element originWGS84 or originAddress MUST be specified.) |
| destinationWGS84 | Location_Point | Yes | Location information about a destination represented by WGS84 (Location Point structure is defined in tpeg-locML [TTI LOC]. At least one element destinationWGS84 or destinationAddress MUST be specified.) |

TABLE 1-continued

| Element | Type | Optional | Description |
|---|---|---|---|
| destinationAddress | Civic Address Format | Yes | Location information about the destination represented as a civic location (Civic Location Format is defined by IETF [RFC 5139]. At least one element destinationWGS84 or destinationAddress MUST be specified.) |
| waypoints | Location_Point [0 . . . unbounded] | Yes | Location information about a way point (represented by WGS84)(Location_Point structure is defined in tpeg-locML [TTI LOC].) |
| startingTime | xsd:dateTime | Yes | Starting time of navigation service (if a service starting time is specified, the trip is a planned trip. If a service starting time is not specified, a current time is the service starting time). (starting time of the planned trip. If not present, current time is assumed.) |
| tollRoad | xsd:boolean | Yes | It indicates whether passing through a toll road is allowed. (If true or not present, a toll road is allowed.) |
| vehicleType | Vehicle_Info | Yes | Information about a used vehicle (Vehicle_Info structure is defined in tpeg-rtmML [TTI RTM].) |
| calculateRoute | xsd:boolean | Yes | It indicates whether the server provides a calculated route. (If false or not present, the server should not propose routes.) |
| link | common:Link [0 . . . unbounded] | Yes | Lin information about routes defined in the trip. (Links to routes related to the trip. Attribute "rel" must be set to "Route".) |
| resourceURL | xsd:anyURI | Yes | Self-referring URL information (Self-referring URL. SHALL NOT be included in POST requests, MUST be included in responses to any HTTP method that returns an entity body, and in PUT requests.) |

2) Route Structure: a route structure is expressed as a plurality of segments as a way to represent total routes calculated using the trip structure.

TABLE 2

| Element | Type | Optional | Description |
|---|---|---|---|
| travellingTime | xsd:float | Yes | Total travelling time (in minutes) for the route |
| distance | xsd:float | Yes | Total distance (in Km) of the route |
| origin | Location_Point | No | Origin of the route (represented by WGS84) (Location_Point structure is defined in tpeg-locML [TTI LOC].) |
| segment | Segment [1 . . . unbounded] | No | Sequence of road segments that form the route |
| trafficEvents | CategorizedEvent ListReference [0 . . . unbounded] | Yes | Information about links accessing traffic information resources (List of traffic events as defined in tpeg-rtmML [TTI RTM], grouped into categories.) |
| link | common:Link | Yes | Reference to the route for which it is proposed as alternative. Attribute "rel" must be set to "Route". |
| resourceURL | xsd:anyURI | Yes | Self-referring URL. SHALL NOT be included in POST requests, MUST be included in responses to any HTTP method that returns an entity body, and in PUT requests.) |

3) Segment Structure: it is a structure that represents each segment. The segment structure may define a real-time traffic state corresponding to the segment as well as the length of the segment, in TPEG.

TABLE 3

| Element | Type | Optional | Description |
|---|---|---|---|
| endPoint | Location_Point | No | Location information about the end point of each segment (represented by WGS84)(Location_Point structure as defined in tpeg-locML [TTI LOC]. The starting point of the segment should be assumed equal to the ending point of the previous segment (or the trip origin for the first segment)) |

TABLE 3-continued

| Element | Type | Optional | Description |
|---|---|---|---|
| midwayPoint | Location_Point [0 . . . unbounded] | Yes | Location_Point structure as defined in tpeg-locML [TTI LOC]. |
| linkName | xsd:string | Yes | Name of the road that the segment belongs to |
| distance | xsd:float | Yes | Length of the segment in km |
| travellingTime | xsd:float | Yes | Estimated average time to cover the segment expressed in minutes. It includes regular travelling time and delay. |
| delay | xsd:float | Yes | Estimated delay along the segment expressed in minutes. |
| speed | xsd:float | Yes | Estimated average speed along the segment expressed in m/s. |
| performance | xsd:string | Yes | Information about traffic state (levels may be defined to indicate delay, congestion, and severe congestion). (Description of traffic conditions along the segment. This field should be encoded according to tpeg rtmML definition [TTI RTM].) |

FIG. 2 is a diagram illustrating a signal flow for an operation of a lightweight ND in a conventional DynNav system. Because the lightweight ND does not support route calculation in view of its capability, the lightweight ND should request route information to a server and receive the route information from the server. The lightweight ND has the following main functionality.

1. The lightweight ND transmits trip information to the server, for use in route calculation at the server.

2. The lightweight ND receives information about a set of routes (including a recommended route) calculated by the server from the server.

3. The lightweight ND subscribes to a notification service to receive real-time traffic information from the server.

The signal flow illustrated in FIG. 2 contains the followings, on the whole.

1. The user defines journey parameters, and the application sends the parameters to the server; the server calculates a set of proposed routes based on the received parameters with related traffic information. The server replies with the location of the created "trip" resource to the application.

a) The server may reply with a representation of created "trip" resource, which contains resources identifiers of the proposed routes. In this case, message 2 is no longer required.

2. The application uses the trip resource to access trip's information which contains resources identifiers of the proposed routes.

3. The application uses the Route Identifier to access information describing each single proposed route with links to traffic events and performance parameters.

4. The application accesses then to traffic events related to the route, using links to traffic event resources provided in the route structure.

5. The user selects a route among the set of routes for which he is interested in receiving updated performance parameters and traffic events, and alternative routes when available.

6. The application requests to the server to create a subscription to notification service for the trip and route(s). The application is notified by the server of the following events:

New performance parameters and changes in traffic events, notification resource will include links to already existing routes resources.

Proposal of alternative routes due to traffic problems along the proposed routes; the notification resource will include the link to trip resource.

7. Traffic events and/or changes of performance parameters occur on the subscribed route(s): a notification resource is created.

8. The server delivers the notification resources to the application with links to modified resources, including the trip and the route with the updated traffic information (traffic events and performance parameters).

9. The application accesses the updated resources. The resources should be reflected in appropriate way.

10. The application request to modify the subscription setting adding notification for the new route. Just in case, the updated resource is an alternative route in step 9.

FIG. 3 is a diagram illustrating a signal flow for an operation of a smart ND in the conventional DynNav system. Because the smart ND supports route calculation in view of its capability, the smart ND calculates a route on its own based on trip information defined by a user and transmits information about the calculated route to a server. The smart ND has the following main functionality.

1. The smart ND calculates a route based on trip information.

2. The smart ND transmits information about the calculated route to the server and the server notifies the smart ND of a real-time traffic state.

3. The smart ND subscribes to a notification service based on the transmitted route information in order to receive real-time traffic information from the server.

The signal flow illustrated in FIG. 3 contains the followings on the whole.

1. The user defines journey parameters and the application sends parameters to the server. The server replies with the location of the created "trip" resources to the application.

a) The server may replay with a representation of created "trip" resource. In this use case behaviors are equivalent.

2. The application uploads the calculated route under the resource/{tripId}/routes. The server replies with a representation of the "route" resource, which contains performance parameters and links to traffic events.

a) The server may reply with the traffic information (performance parameters and traffic events). In this case an additional get operation is needed to retrieve content of resource.

3. The application subscribes to notification service for the trip and route.

4. Traffic events and/or changes of performance parameters occur on the subscribed route(s); a notification resource is created.

5. The server delivers the notification resource to the application with links to the modified resources, including the trip and the route with updated performance parameters and traffic information.

6. The application accesses to the updated resources and read the resources.

7. The application decides to calculate a new route with the received resources.

8. The application uploads the new calculated route under the resource/{tripId}/routes. The server replies with a representation of the "route" resources, which contains route performances and links to vents. This step may be repeated many times until a route that satisfies performance constrains is found.

9. The application requests to modify the subscription setting adding notification for the newly subscribed route.

The lightweight ND and the smart ND in the conventional DynNav system as described with reference to FIGS. 2 and 3 suffer from some problems. These problems will be described below. Since the problems vary with the ND types (lightweight or smart), the problems will be described in relation to the individual ND types.

A) When the Smart ND Calculates an Initial Route, the Smart ND Cannot Apply Real-Time Traffic Information.

A problem with the smart ND in the conventional technology is that the smart ND cannot use real-time information appropriately in route calculation. The route calculated by the smart ND in step 2 of FIG. 3 does not reflect real-time traffic information at all. Since the smart ND cannot use real-time traffic information as route information, a high-quality route guidance service cannot be provided to the user. Moreover, an operation for tracking the route that does not reflect real-time traffic information by the server, subsequently to step 2 in which the smart ND transmits information about the calculated route to the server, may be unnecessary.

Another problem that may be encountered with the smart ND is unnecessary consumption of network resources. As in step 8 of FIG. 3, the ND transmits information about its calculated route a plurality of times in order to search for an optimal route. The above-described operation for detecting an optimal route may be performed in various manners depending on methods and designs. When speaking of probability, an optimal route may be detected by transmitting route information one or more times. Continuing a transmission operation with uncertain probability may lead to unnecessary consumption of network resources. From the perspective of the user using the ND, this means excessive cost and a lengthened time for detection of an optimal route, which may disturb safe traveling of the user.

In general, information that the ND receives from the user is the location of a user-intended destination. Without real-time traffic information, the terminal generally calculates a route in a shortest road-first or express way-first manner. As illustrated in FIG. 4, since the smart ND does not reflect real-time traffic information in calculating an initial route, the smart ND calculates a shortest route running through S-4-A-b-D. However, an actual optimal route is S-1-A-a-D in consideration of congestion roads marked in FIG. 4 (c1 denotes a congestion-free road, c2 denotes a normal-congestion road, and c3 denotes a severe-congestion road). If the terminal travels in the corresponding route, the user experiences congestion even from the start of the trip and then will pass through a road b under construction. This implies that in the case of severe traffic congestion within a reference radius of an origin as illustrated in FIG. 4, there is a need for the server to provide corresponding traffic information.

B) Problem Encountered when the Current Location of a Terminal is Not Known.

This problem is common to both the lightweight ND and the smart ND. For simplicity of description, the smart ND will be taken as an example. After calculating a route, the smart ND transmits information about the calculated route to the server and the server continuously estimates the state of the route to provide a notification service for the route.

However, the estimated overall route uploaded by the ND is effective only at the moment of the upload. Once a vehicle carrying the smart ND travels in the route for a certain distance, estimation of the state of the route for the distance or delivery of information about the estimated route state to the smart ND is meaningless. That is, in the case where the server does not know the current location of the serviced smart ND, the server transmits unnecessary information to the smart ND. This means transmission of unnecessary information and the resulting power consumption on the part of the network and unnecessary resource consumption for the management of information transmission on the part of the server.

FIG. 5 illustrates a problem encountered when a server does not know the current location of an ND. As illustrated in FIG. 5, after a predetermined time elapses, segments 100b and 101b need route estimation. If total routes are denoted by 100a and 101a, the total routes 100a and 101a are different from the segments 100b and 101b with the passage of time. These differences do not need management. In this context, the present invention is intended to solve the problem that occurs due to the absence of knowledge of the current location of a terminal.

C) Problem During Transmission of Summarized Route Information.

This problem occurs to the lightweight ND. When the server calculates routes based on real-time traffic information and transmits information about the calculated routes to the lightweight ND, the following operation is performed.

1. The ND transmits origin information and destination information to the server.

2. The server generates a plurality of routes based on the received origin and destination information.

3. The ND or its user subscribes to a traffic information notification service to select a route, transmit information about the selected route, and receive the traffic information notification service.

4. The ND performs a navigation service along the selected route.

During the above procedure, the server typically generates a plurality of routes and transmits information about the plurality of routes to the ND to increase the quality of a service experienced by the user and widen a selection range for the user. Then the ND or its user may select one of the plurality of routes. The problem herein is that the user should receive all of actually unnecessary route information and after selecting one of the routes, the user deletes the remaining route information. As a consequence, network resources may be wasted.

To overcome the problem encountered with steps 1 to 4 described above, it has been proposed that only a summary of information about calculated routes is initially transmitted to an ND. In order to prevent network resource waste, the server selectively transmits a part of the information about the calculated routes (e.g., important segment information, traveling times, toll, etc.) to the ND. Then the ND or its user selects one of the calculated routes based on the received information (i.e. a summary) and/or the user's preferences and notifies the server of the selected route. Thus the server transmits only full route information about the selected route from among the plurality of routes to the ND in response to the request.

Nonetheless, the conventional technology still suffers from a problem. This problem occurs when the distance between an origin and a destination is short. If the distance between an origin and a destination is short, the size of transmitted segment information is small. Thus, a summarizing operation of the server to generate a summary of route information and interaction between the server and an ND may degrade the performance of a navigation system. In other words, there is no need for transmitting summarized route information in this case. Rather, it may be preferred to transmit full route information.

DISCLOSURE

Technical Problem

An object of the present invention devised to solve the conventional problem is to provide a method for, when two types of services or terminal types are supported, overcoming a problem encountered with a conventional service, that is, inefficiency of transmission of route information and real-time traffic information.

Technical Solution

In an aspect of the present invention, a method for calculating a route for a trip identified by an origin and a destination, using traffic information at a terminal, includes requesting traffic information related to the trip to a server, receiving the traffic information related to the trip from the server, and calculating the route using the received traffic information. The received traffic information may include a traffic event corresponding to information on an obstacle to a traffic flow in an area or a route related to the origin and the destination and a performance parameter corresponding to information on a traffic flow in a road segment within a predetermined radius from the origin. The performance parameter may be received from the server if there is congestion at or above a predetermined level within the predetermined radius of the origin.

Preferably, the traffic event may include an event comprising a road work or an accident related to the area or the route.

Preferably, the performance parameter may include at least one of a speed, congestion, or a travel time of the road segment.

Preferably, the requesting of the traffic information related to the trip may include requesting the traffic information to the server, using boolean-type data.

In another aspect of the present invention, a terminal for calculating a route for a trip identified by an origin and a destination, using traffic information received from a server, includes a transceiver configured to communicate with the server, and a processor configured to calculate the route using the traffic information received from the server. The processor may be configured to request traffic information related to the origin and the destination to the server, control the transceiver to receive the traffic information related to the trip from the server, and calculate the route using the received traffic information. The received traffic information may include a traffic event corresponding to information on an obstacle to a traffic flow in an area or a route related to the trip and a performance parameter corresponding to information on a traffic flow in a road segment within a predetermined radius from the origin of the trip. The performance parameter may be received from the server if there is congestion at or above a predetermined level within the predetermined radius of the origin.

Preferably, the traffic event may include an event comprising a road work or an accident related to the area or the route.

Preferably, the performance parameter may include at least one of a speed, congestion, and a travel time of the road segment.

Preferably, the processor may be configured to request the traffic information to the server, using boolean-type data.

In another aspect of the present invention, a method for acquiring a route for a trip identified by an origin and a destination from a server at a terminal includes requesting a set of routes for the trip calculated by the server to the server, and receiving the requested set of routes from the server. The requested set of routes may be routes in a summarized format or routes in a full format.

Preferably, the requested set of routes may be provided as the route in the summarized format or the route in the full format based on at least one of a length and complexity of the routes or quality of a network environment between the terminal and the server.

Preferably, if the length and complexity of the routes are shorter and lower than a predetermined length and a predetermined complexity respectively, and the quality of the network environment is better than a predetermined quality, the routes in the full format may be received from the server.

Preferably, the method may further include, upon receipt of the routes in the summarized format for the requested set of routes from the server, requesting a route in a full format for a route selected from the set of routes to the server.

In another aspect of the present invention, a terminal for acquiring a route for a trip identified by an origin and a destination from a server includes a transceiver configured to communicate with the server, and a processor configured to calculate the route using traffic information received from the server. The processor may be configured to request a set of routes for the trip calculated by the server to the server, and control the transceiver to receive the requested set of routes from the server. The requested set of routes may be routes in a summarized format or routes in a full format.

Preferably, the requested set of routes may be provided as the routes in the summarized format or the routes in the full format based on at least one of a length and complexity of the routes or quality of a network environment between the terminal and the server.

Preferably, if the length and complexity of the routes are shorter and lower than a predetermined length and a predetermined complexity respectively, and the quality of the network environment is better than a predetermined quality, the routes in the full format may be received from the server.

Preferably, upon receipt of the routes in the summarized format for the requested set of routes from the server, the processor may be configured to request route in a full format about a route selected from the set of routes to the server.

The afore-described aspects of the present invention are merely a part of preferred embodiments of the present invention. Those skilled in the art will derive and understand various embodiments reflecting the technical features of the present invention from the following detailed description of the present invention.

Advantageous Effects

According to the embodiments of the present invention, unnecessary data transmission between a navigation device (or an application program) and a server is reduced. Therefore, the Quality of Experience (QoE) of a user can be increased.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE FOR CARRYING OUT THE INVENTION

Figure 1:
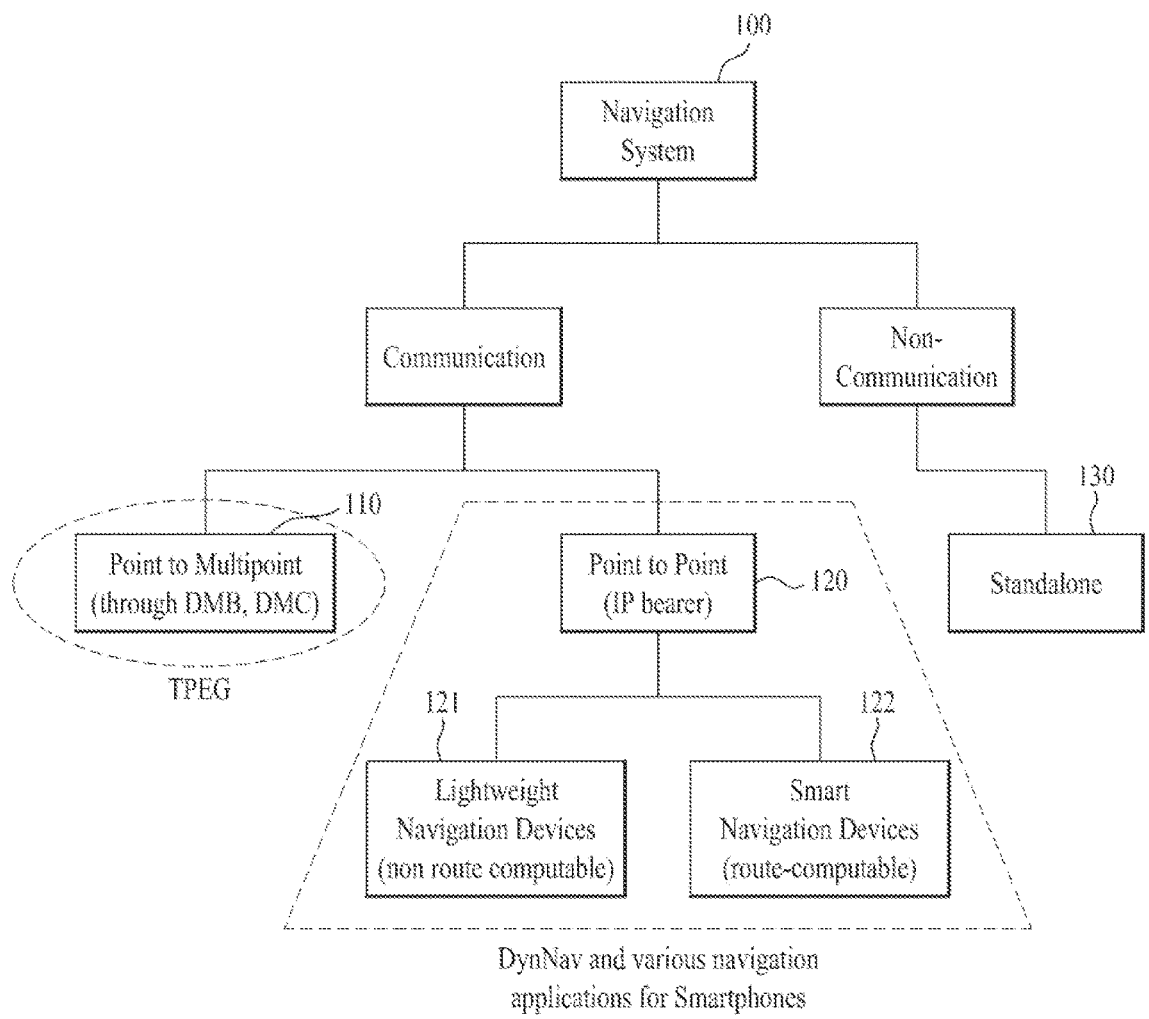
FIG. 1 illustrates different types of Navigation Devices (NDs)
Figure 2:
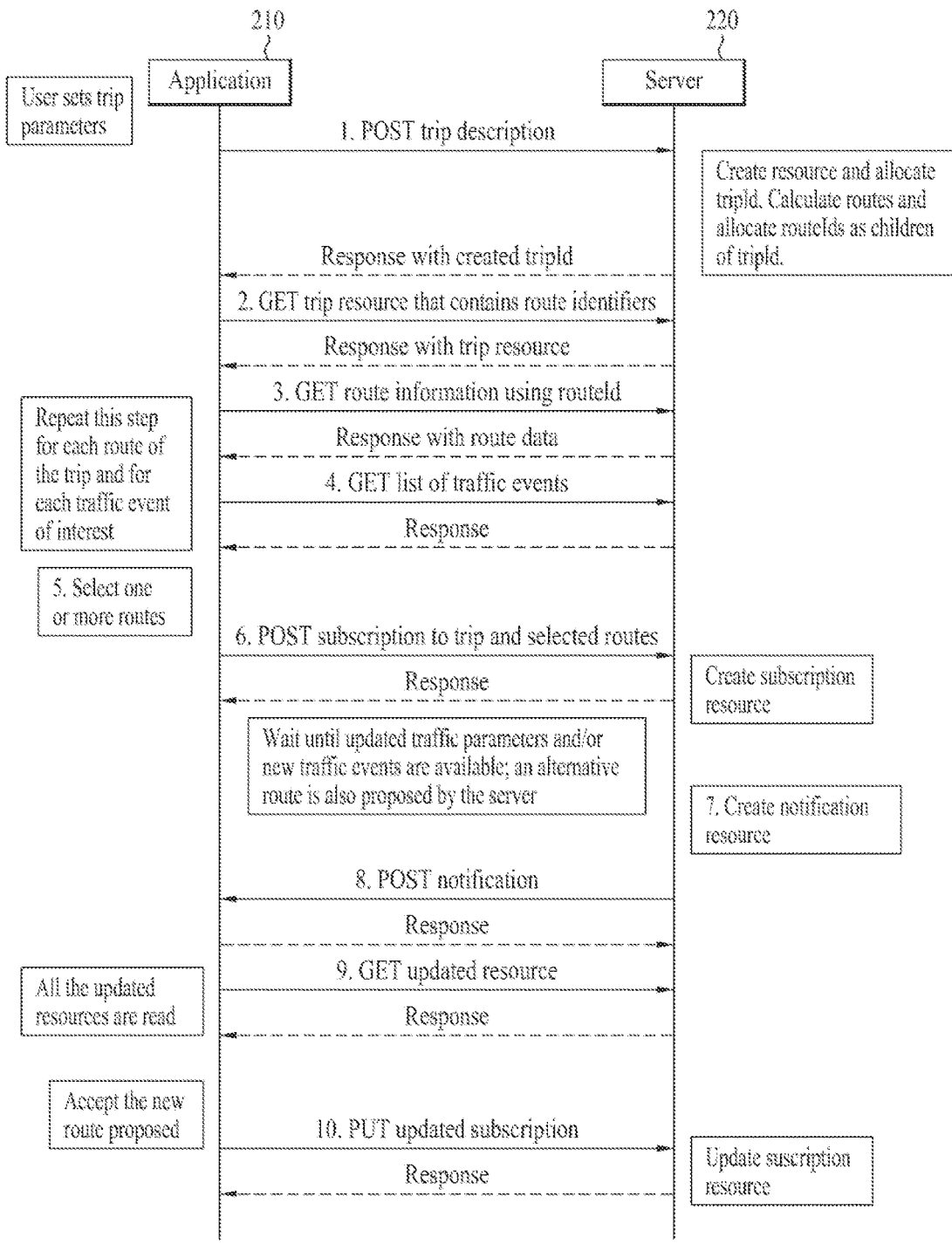
FIG. 2 is a diagram illustrating a signal flow for an operation of a lightweight ND in a conventional Dynamic Navigation Enabler (DynNav) system.
Figure 3:
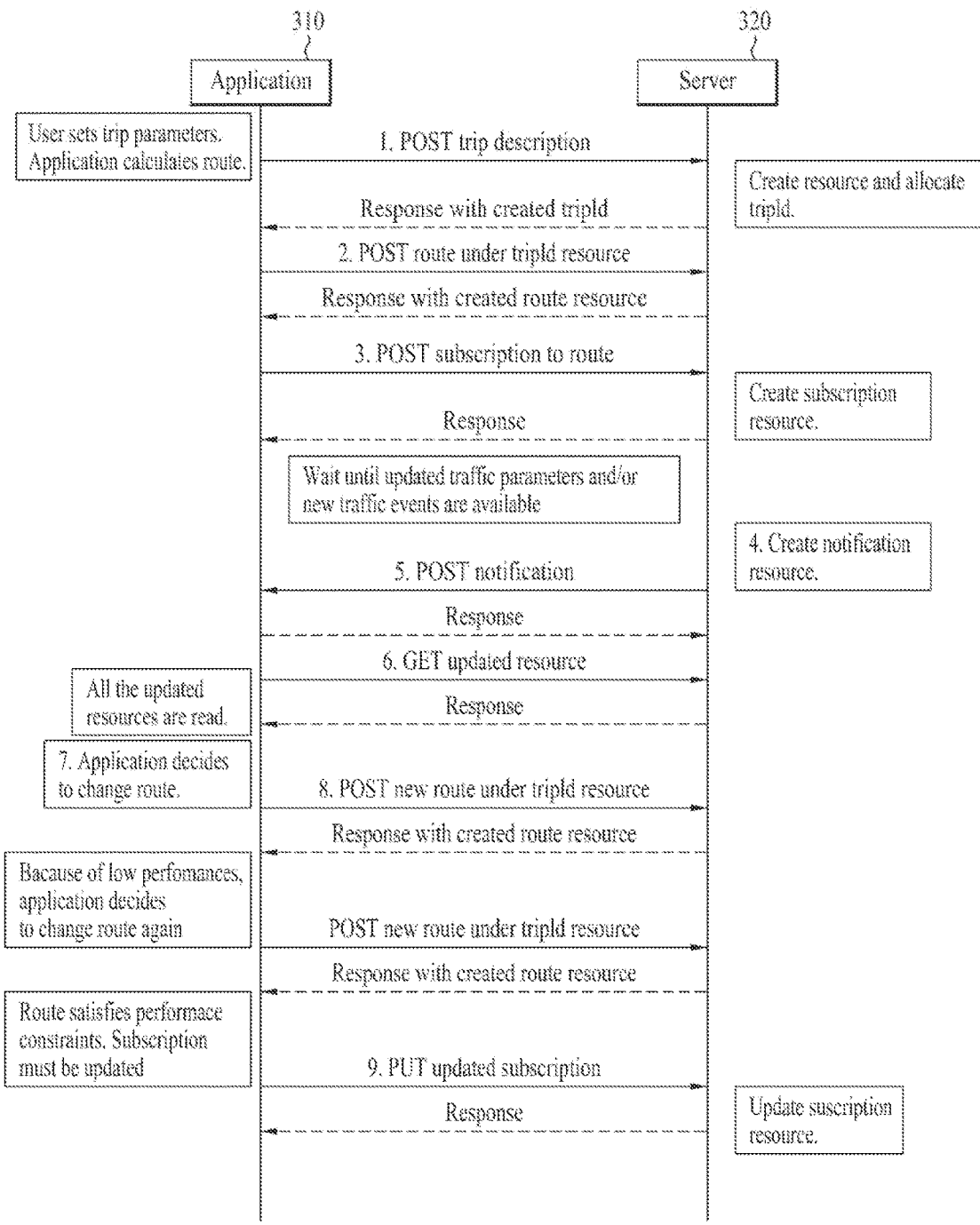
FIG. 3 is a diagram illustrating a signal flow for an operation of a smart ND in the conventional DynNav system.
Figure 4:
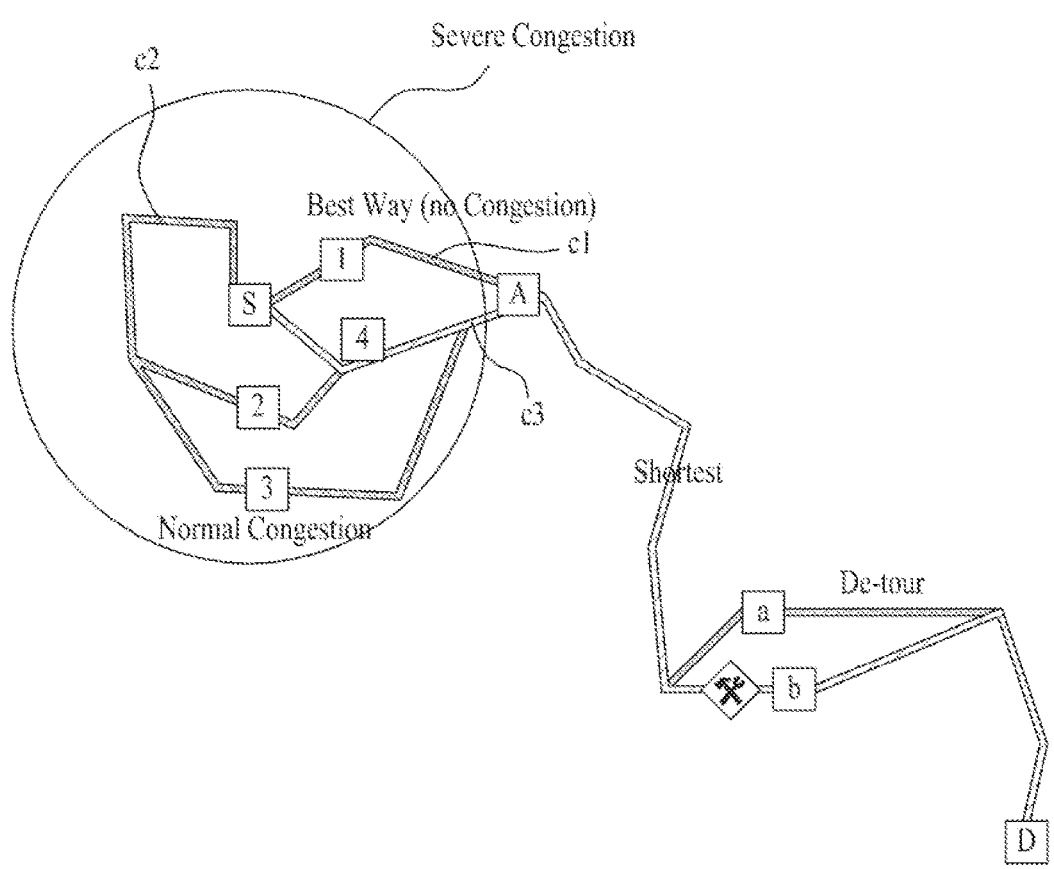
FIG. 4 illustrates available routes between an origin and a destination and traffic information about the routes.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the invention. The same reference numbers will be used throughout this specification to refer to the same or like parts.

Terms used herein will be defined as follows.

Application

An application is an implementation of a well-defined but not standardized set of functions that perform work on behalf of a user. The application may include software and/or hardware elements and associated user interfaces.

Server

In general, a server is an entity that provides resources to clients in response to requests in the technical field of the present invention.

Client

In general, a client is a device, user agent, or other entity that acts as a receiver of a service in the technical field of the present invention.

DynNav Application

A DynNav application is an entity that is in charge of interacting with a DynNav server to get optimal route(s), real-time and forecasted traffic information, and complementary data. Therefore, the DynNav application is loaded in a terminal such as a smartphone, a mobile phone, an ND, etc. Accordingly, the term DynNav application is interchangeably used with terminal. In this aspect, the DynNav application is a kind of client.

DynNav Server

A DynNav is an entity that is in charge of providing optimal route(s), real-time and forecasted traffic information, and complementary data to the application. In this aspect, the DynNav server is a kind of server.

Lightweight ND

A lightweight ND is a navigation device that does not have a route calculation function, requests a calculated route to a server, and receives information about the calculated route from the server. The lightweight ND accesses the server for route estimation functionalities and for retrieving roads shape representation, if not available in a local map database.

Location URI

A location Uniform Resource Identifier (URI) is a URI that enables the current location of a device to be obtained from a particular location server using a particular dereferencing protocol.

Navigation Device (ND)

An ND is an entity that assists a driver, showing a correct route using a Global Navigation Satellite System (GNSS) service to reach a final destination. This entity may process real-time and predicted traffic information and dynamically estimates the optimal route, according to user preferences.

Point of Interest (POI)

A POI describes information about locations such as name, category, unique identifier, or civic address.

Segment

A segment is a unit into which a road is divided. For a general road, a road running between intersections is a segment, whereas for a highway, a road is divided into segments according to a policy for the highway. Traffic congestion or a passing time may be determined on a segment basis. In the specification, the term segment is interchangeably used with a road section.

Polyline

A polyline is a continuous line used in graphic computing composed of one or more line segments, defined by specifying the endpoints of each segment.

Route Information

Route information is information about segment end points and complementary data from a defined origin and a destination.

Smart ND

A smart ND is a navigation device that is able to calculate a route(s), using a road network database available on the device itself.

Traffic Information

Traffic information is information including traffic events and network performance parameters related to an area or a route. Further, the traffic information may include current or upcoming, that is, future traffic information.

Traffic Event

A traffic event is information about events related to an area or a route that are either imposed or planned by a road network operator (i.e., road works leading to lane closures) or events that occur outside the control of the road network operator (i.e., accidents).

Network Performance Parameter

A network performance parameter is information regarding the performance (i.e., speed, delay, and travel time) of road segments related to an area or a route).

Route Information in Full Format

Route information in a full format is a type of route information including information about all segments from a origin to a destination. Unless specified otherwise, route information is about a whole route.

Route Information in Summarized Format

Route information in a summarized format is a kind of route information including only information about segments selected for a summary of information from among all segments of a route between an origin and a destination (how segments are to be selected is beyond the scope of the present invention).

The present invention relates to a navigation system, method, and apparatus for reflecting real-time traffic information, and more particularly, to a navigation system, method, and apparatus for allowing a traffic information providing server to transmit real-time traffic information to an ND using a minimal communication bandwidth, when the ND is able to calculate a route on its own and has a modem connectable to a mobile communication network in a system for providing real-time traffic information. The present invention relates to a navigation system, method, and apparatus for allowing a traffic information providing server to transmit information about an optimal route and real-time traffic information to an ND even though the ND is not able to calculate a route on its own but is connectable to a mobile communication network.

Along with the recent proliferation of smartphones, a navigation service of providing a travel route to a mobile communication terminal in a manner other than using a conventional Digital Multimedia Broadcasting (DMB) network is becoming popular. The OMA LOC WG calls this service Dynamic Navigation Enabler (DynNav).

In the specification, an ND refers to a device that can execute a route guidance function. The ND is any electronic device that can be carried, like a smartphone, a mobile phone, a mobile device, a laptop computer, a tablet PC, a smart pad, etc. or that can be attached to a portable object.

Figure 6:
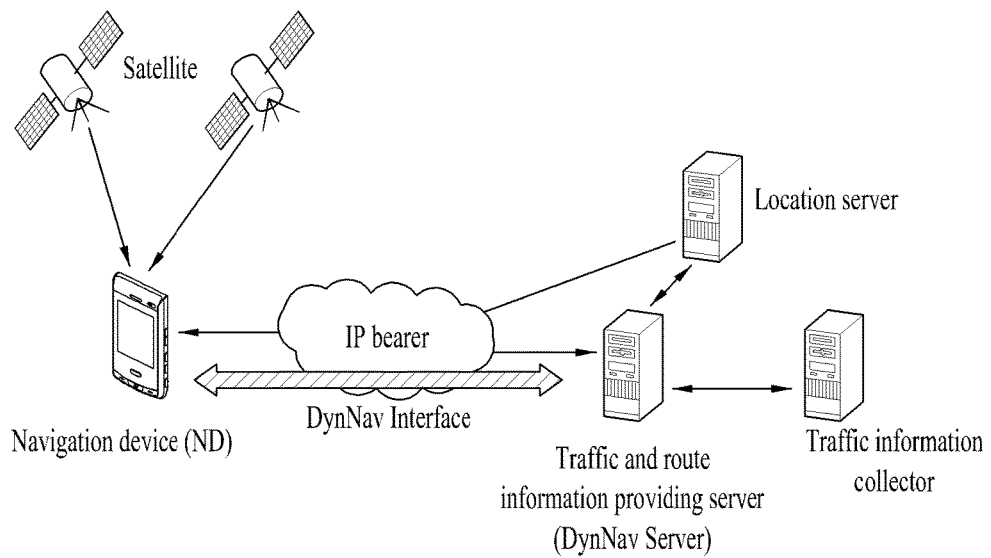
FIG. 6 illustrates a network configuration referred to for describing an Internet Protocol (IP)-based DynNav system being a navigation system according to the present invention.

FIG. 6 illustrates a network configuration referred to for describing an Internet Protocol (IP)-based DynNav system being a navigation system according to the present invention. As illustrated in FIG. 6, the navigation system according to the present invention may include an ND that may be connected to a mobile communication network, a mobile communication network for wireless transmission and reception, a traffic information collector and a traffic information and route information providing server (i.e. a DynNav server), which provide traffic information, and a location server for generating and providing assistance data to locate an ND.

For simplicity of description, the traffic information and route information providing server or the DynNav server is referred to shortly as the "server". The navigation device is referred to shortly as the ND. According to the capability of an ND, the ND is referred to as the "smart ND" or "lightweight ND".

In the present invention, a terminal (two terminal types are available, as described before) may be connected to a mobile communication network or an IP network such as a Wireless Fidelity (Wi-Fi) network as illustrated in FIG. 6. A corresponding application may access the server, receive route guidance data and real-time traffic information, and thus provide route guidance. While not shown, a terminal capable of calculating a route on its own may selectively receive only real-time traffic information without receiving route guidance data from the server.

The real-time traffic information refers to optimal route information calculated and transmitted to the terminal by the server, real-time and forecasted traffic information, and additional information related to traffic, such as POI and weather. To avoid representational redundancy, a navigation application or a terminal is collectively referred to as a terminal. Accordingly, the terms "terminal", "smart ND", "lightweight ND", and "navigation application" may be referred to uniformly as "terminal".

Figure 7:
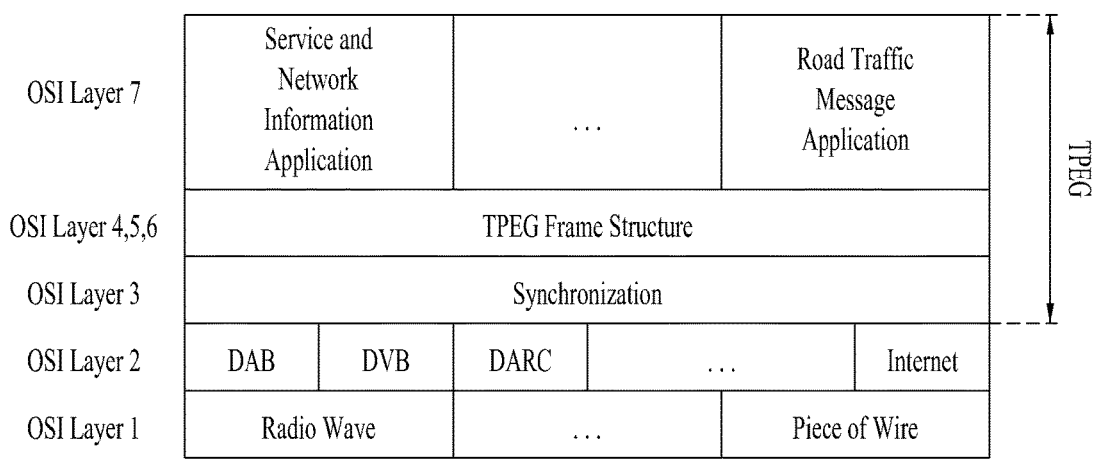
FIG. 7 illustrates a stack of Traffic Protocol Expert Group (TPEG) layers.

The afore-mentioned real-time traffic information may be represented in Transport Protocol Experts Group (TPEG) under consideration in the ISO standardization organization. TPEG is a standard protocol used to transmit traffic information and travel information over a digital broadcasting network. As illustrated in FIG. 7, a TPEG layer stack corresponds to the network layer (Layer 3; L3) to application layer (Layer 7; L7) of the ISO/OSI layer model. The network layer defines TPEG frame synchronization and routing. The packetization layer of Layers 4, 5, 6 (L4, L5, and L6) combines components of applications into one stream. Each message format corresponds to the application layer, L7. In DynNav, real-time traffic information may be provided to a terminal in a real-time traffic information representation scheme of TPEG or any other representation scheme.

Figure 8:
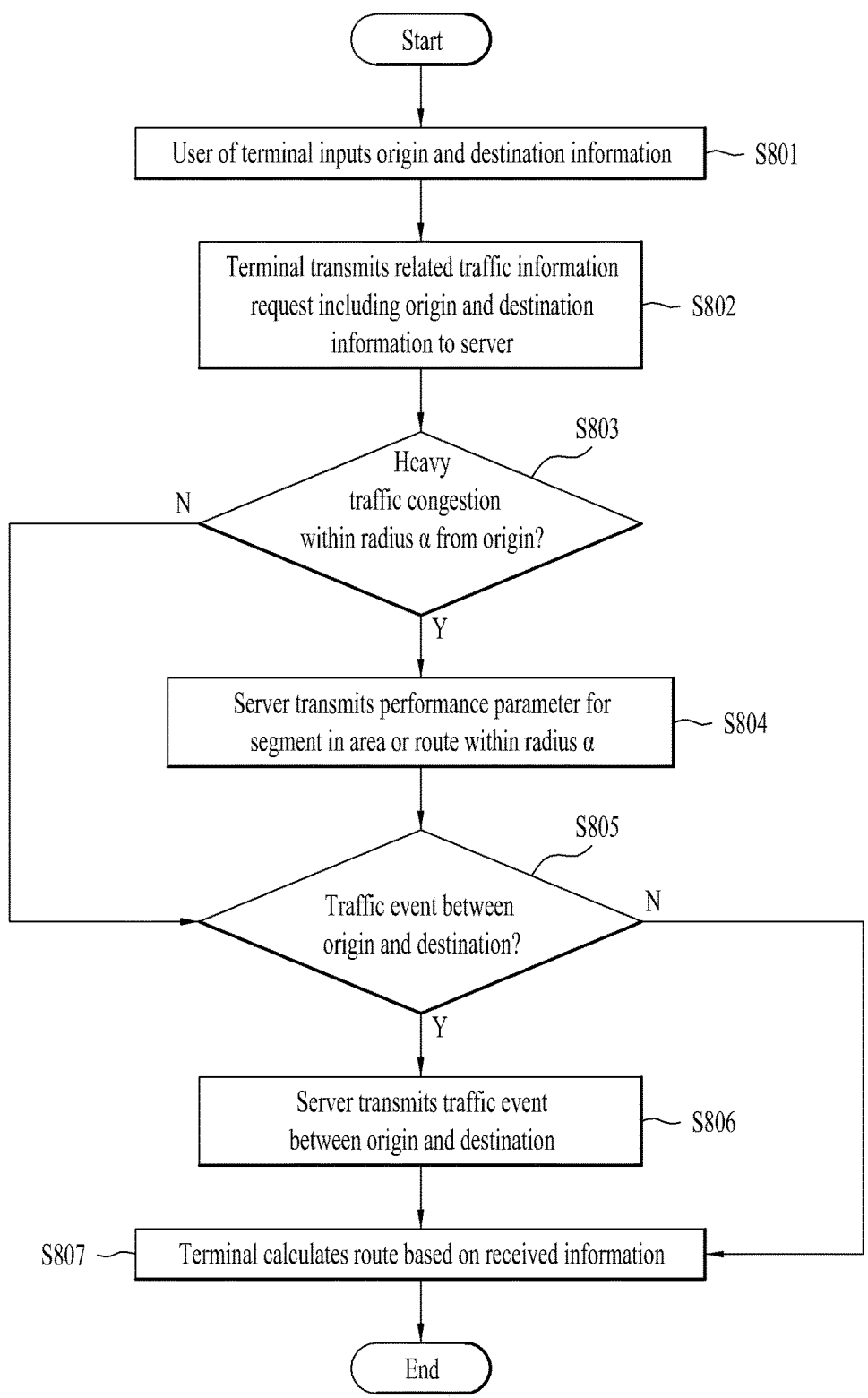
FIG. 8 is a flowchart illustrating an operation according to an embodiment of the present invention.

FIG. 8 is a flowchart illustrating an operation according to an embodiment of the present invention. A smart ND performs the operation illustrated in FIG. 8. To solve the afore-described problem of A), the smart ND may receive traffic information from a server before it calculates a route on its own. The traffic information includes an afore-defined traffic event and (network) performance parameter. The traffic information refers to information that guides the smart ND to avoid a heavily congested road segment or a road segment experiencing an event likely to cause traffic congestion such as an accident or a road work, in calculating a route. In addition, the traffic information may also be referred to as bypass traffic information in the specification. For reference, the performance parameter corresponds traffic flow information (e.g., an average speed, a travel time, etc. of a road segment) about all road sections (or segments). A traffic event corresponds to information about an event such as an accident or a road work in a road segment. Thus, the traffic event occupies a smaller data size than the performance parameter.

The terminal acquires trip structure information such as an origin and a destination from an initial navigation user. Before calculating a route based on the trip structure information, the terminal transmits the trip structure information to the server and receives traffic information about related routes from the server. With reference to FIG. 8, the operation of the terminal will be described below in greater detail.

A user of the terminal may input information about an origin and a destination to the terminal (S801). In general, the origin information may be automatically detected and input through a Global Positioning System (GPS) receiver built in the terminal. The origin and the destination are elements that identify a trip. The terminal may transmit a traffic information request message including the input origin and destination information to the server (S802). That is, the terminal may transmit the origin and destination information that identifies the trip and request traffic information (a neighbor road traffic message) about an area or route related to the origin and the destination to the server. Upon receipt of the request, the server may determine whether traffic is heavily congested (i.e. traffic congestion equal to or heavier than a predetermined level) within a predetermined radius a of the origin (S803).

If traffic is heavily congested within the predetermined radius a of the origin in step S803, the server may transmit a performance parameter for a segment of the area or route within the radius to the terminal (S804). Otherwise, the server may jump to step S805. Then the server may determine whether a traffic event has occurred in the area or route between the origin and the destination (S805).

In the presence of a traffic event in the area or route between the origin and the destination in step S805, the server may transmit the traffic event to the terminal (S806). Otherwise, the server may jump to step S807, skipping step S806.

Upon receipt of traffic information related to the origin and the destination, the terminal may calculate a route based on the received traffic information (S807).

In summary, the server may transmit the traffic information related to the origin and the destination under the following conditions:

1) in the presence of heavy traffic congestion in an area near to the origin (within a radius of am); and 2) in the presence of a traffic event between the origin and the destination.

If condition 1) is satisfied, the server transmits a performance parameter for the area near to the origin to the terminal. If condition 1) is not satisfied and a traffic event has occurred between the origin and the destination, the server transmits the traffic event to the terminal. If none of conditions 1) and 2) are satisfied, the server does not transmit any information to the terminal.

The order of steps S803 and S804 and the order of steps S805 and S806 may be exchanged in the flowchart of FIG. 8. Or the steps may be performed simultaneously. In other words, while the time order of steps S803 through S806 illustrated in FIG. 8 does not limit the scope of the present invention, steps S803 through S806 should precede route calculation in step S807. Since the terminal receives the traffic information before route calculation, the terminal may calculate a route based on the received traffic information before route guidance. Thus the problem that real-time traffic information is not reflected in calculating an initial route, as described in A) can be overcome. If real-time traffic information is not reflected in calculating an initial route, the terminal should transmit information about at least one route to the server until detecting a route satisfying a traffic flow constraint (e.g., a travel time in a calculated route, etc.). As described before, route information is generally highly probable to be transmitted a plurality of times. In contrast, if the terminal reflects real-time traffic information in calculating an initial route, the terminal may calculate an optimal route at one time and transmit information about the calculated optimal route to the server. Thus, the necessary operation is completed just by one transmission.

The performance parameter included in the traffic information received for route calculation may be about an area or route within a predetermined radius of the origin of the trip, not about a whole area or route. Since only a part of performance parameters occupying a larger amount of data than a traffic event related to the area or route within the same range is provided to the terminal, the efficiency of network resources can be increased and a time taken for calculating a route at the terminal can be reduced. In addition, since the terminal selectively receives only the performance parameter related to the vicinity of the origin and reflects the performance parameter in route calculation, the terminal does not receive and reflect unnecessary performance information about an area beyond the vicinity of the origin, which experiences a change along with the travel (i.e. over time), considering the nature of each segment experiencing a fluctuating change over time.

Figure 9:
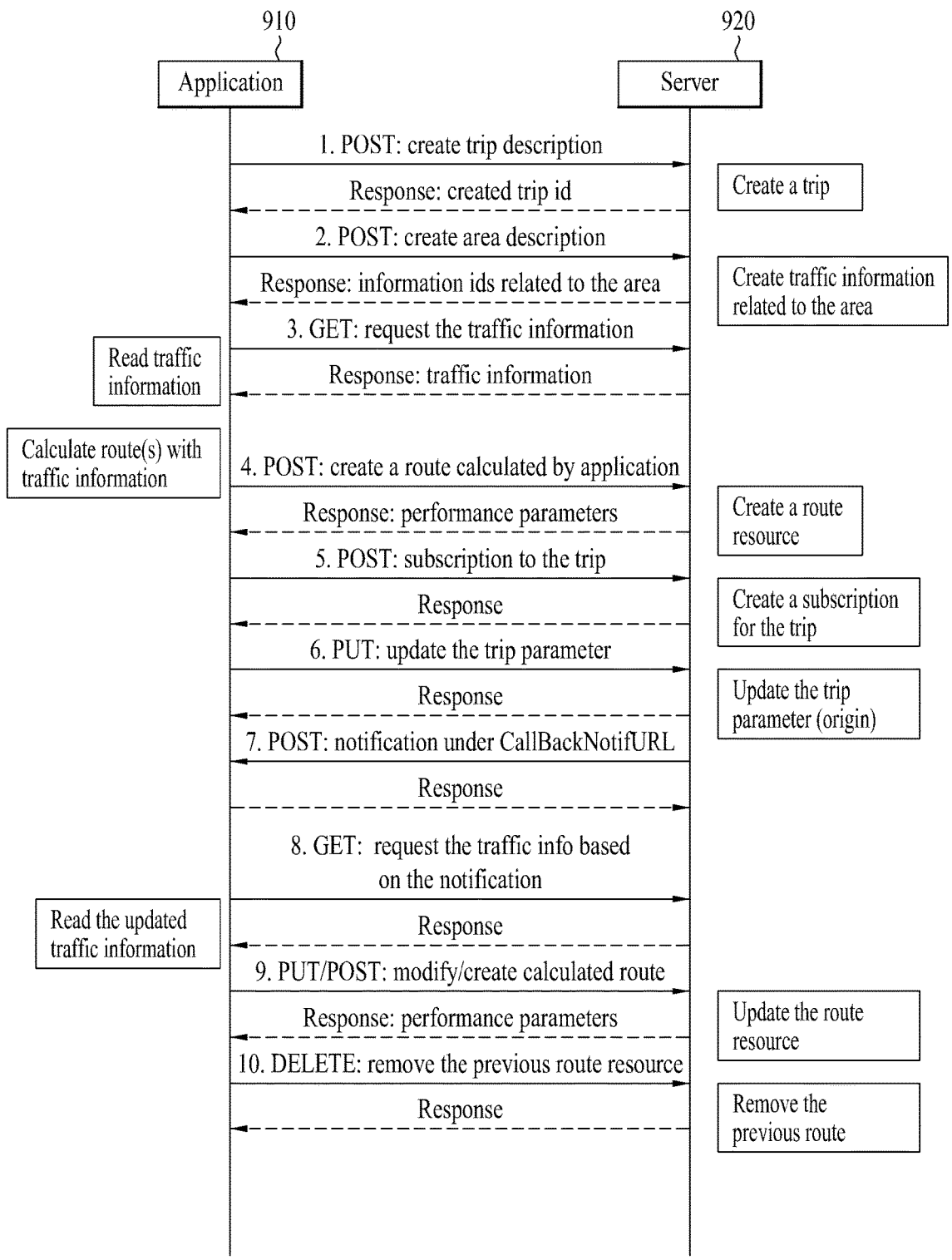
FIG. 9 is a diagram illustrating a signal flow for a detailed operation according to an embodiment of the present invention.

FIG. 9 is a diagram illustrating a signal flow for a detailed operation according to the embodiment of the present invention illustrated in FIG. 8. An application 910 corresponds to a DynNav application and may be referred to as a "terminal", as described before. Accordingly, the application will be referred to as the "terminal" in the description of FIG. 9. A server 920 corresponds to a DynNav server, as described before.

1. POST: Create Trip Description

The terminal 910 may create a trip description based on trip parameters defined by a user of the terminal 910, that is, information about an origin and a destination or other information, using a POST command. The server 920 may generate a trip corresponding to the trip description and transmit an Identifier (ID) of the trip and defined parameters to the terminal 910 in response to the received trip description.

2. POST: Create Area Description

To request traffic information related to the trip identified by the origin and the destination, the terminal may create an area description using a POST command. The server may reply with two types of traffic information, for optimization of a bandwidth and an operation.

a) In the presence of heavy traffic congestion in the vicinity of the origin, the server may transmit a (network) performance parameter for the vicinity of the origin to the terminal. In other words, the (network) performance parameter refers to information about the performance or traffic flow (i.e., speed, delay, and travel time) of segments forming an area or route in the specification. The performance parameter transmitted by the server in "2. POST: create area description" is for an area or route within a predetermined radius of the origin. In the presence of traffic congestion equal to or heavier than a predetermined level in the area or route within the predetermined radius, the server may provide the performance parameter to the terminal.

b) Traffic events in an area related to the trip

3. GET: Request the Traffic Information

The terminal may read the traffic information received from the server using a GET command. The terminal may use the traffic information in estimating or calculating a route for the defined trip, trying to avoid important road segments (affected by accidents, road works, or road congestion).

4. POST: Create a Route Calculated by Application

The terminal may upload the estimated route (selected from among routes calculated by the terminal) to the server using a POST command. The server may reply to the terminal with a representation of "route" resources including performance parameters and links to traffic events.

5. POST: Subscription to the Trip

The terminal may subscribe to a notification service regarding the area selected in step 2 and the trip defined in step 3 using a POST command. The server may notify the terminal of performance parameters and new information about traffic events in regard to the selected area and all uploaded routes for the trip.

6. PUT: Update the Trip Parameter

The terminal may periodically update its current location using a PUT command in order to amend an origin parameter of trip resources. This operation is triggered when a vehicle carrying the terminal moves for a predetermined distance from a previous reported position and the server may use this information to delete already traveled road segments from route(s) information.

7. POST: Notification Under CallBackNotifURL

If the server detects traffic events and/or heavy traffic congestion along the proposed route, the server may transmit updated traffic information about the current route to the terminal by transmitting a POST command to the address or URL (CallBackNotifURL) of the terminal.

8. GET: Request the Traffic Info Based on the Notification

The terminal may access the received updated traffic information (traffic events and performance parameters) related to the route using a GET command.

9. PUT/POST: Modify/Create Calculated Route

The terminal may determine to re-calculate a new route under the following conditions:

a) when the terminal receives updated traffic information in step 8; and b) when it is detected that the terminal has traveled out of a defined route or bypassed the route.

Depending on whether the terminal wants to maintain a previous route as valid, the terminal may upload new calculated routes by generating or modifying an operation using a PUT command for the existing route or a POST command for route factory resources. The server may reply with a representation of "route" resources including performance parameters. This step may be repeated until a route satisfying traffic flow requirements is detected.

10. DELTE: Response the Previous Route Resource

To release the notification service regarding resources using a DELTE command (if a new route substitutes for an existing route by a modification operation in step 9, a deletion operation is not needed), the terminal may delete a previous route that is not used any longer among a set of routes.

[Table 4] below illustrates a structure for representing an area description, particularly in boolean-type data "tripAreaDesc". "tripAreaDesc" may indicate whether the server will provide traffic information to the terminal before the terminal calculates a route. Specifically, this is opposite to definition of a user definition-based area description during a service as is the case when a map of the terminal is changed by POI used in a general navigation service or the user of the terminal "tripAreaDesc" executes the POST command in "2. POST: create area description". If "tripAreaDesc" is set to FALSE, it is used when a user definition-based area description is defined during a navigation service like the afore-described POI case, except for the reception time of traffic information before route calculation at the smart ND.

TABLE 4

| Element | Type | Optional | Description |
| --- | --- | --- | --- |
| areaDesc | Location Container | No | It describes the area for which traffic information, traffic events and network performance parameters, are requested. It is encoded according to Location Container structure as defined in tpeg-locML [TTI LOC]. If the tripAreaDesc field is set to true, this field must contain high level information of a trip in terms of origin and destination points encoded as Location Point [TTI LOC]. |
| startValidityTime | xsd:dateTime | No | Starting time of the interval for which events and network performance parameters are requested. |
| endValidityTime | xsd:dateTime | No | Ending time of the interval for which events and network performance parameters are requested. |
| events | CategorizedEvent ListReference [0 . . . unbounded] | Yes | List of events related to the defined area. The information provided relates to the road network and associated infrastructure. |
| tripAreaDesc | xsd:boolean | Yes | If present and set to true, the server should provide traffic information related to trip information (origin and destination) available in areaDesc field. If set to true, areaDesc field should describe a Trip in terms of 2 points encoded as Location Points [TTI LOC], the first is the origin and the second is the destination. |

TABLE 4-continued

| Element | Type | Optional | Description |
|---|---|---|---|
| resourceURL | xsd:anyURI | Yes | Self-referring URL. SHALL NOT be included in POST requests, MUST be included in responses to any HTTP method that returns an entity body, and in PUT requests. |

Figure 5:
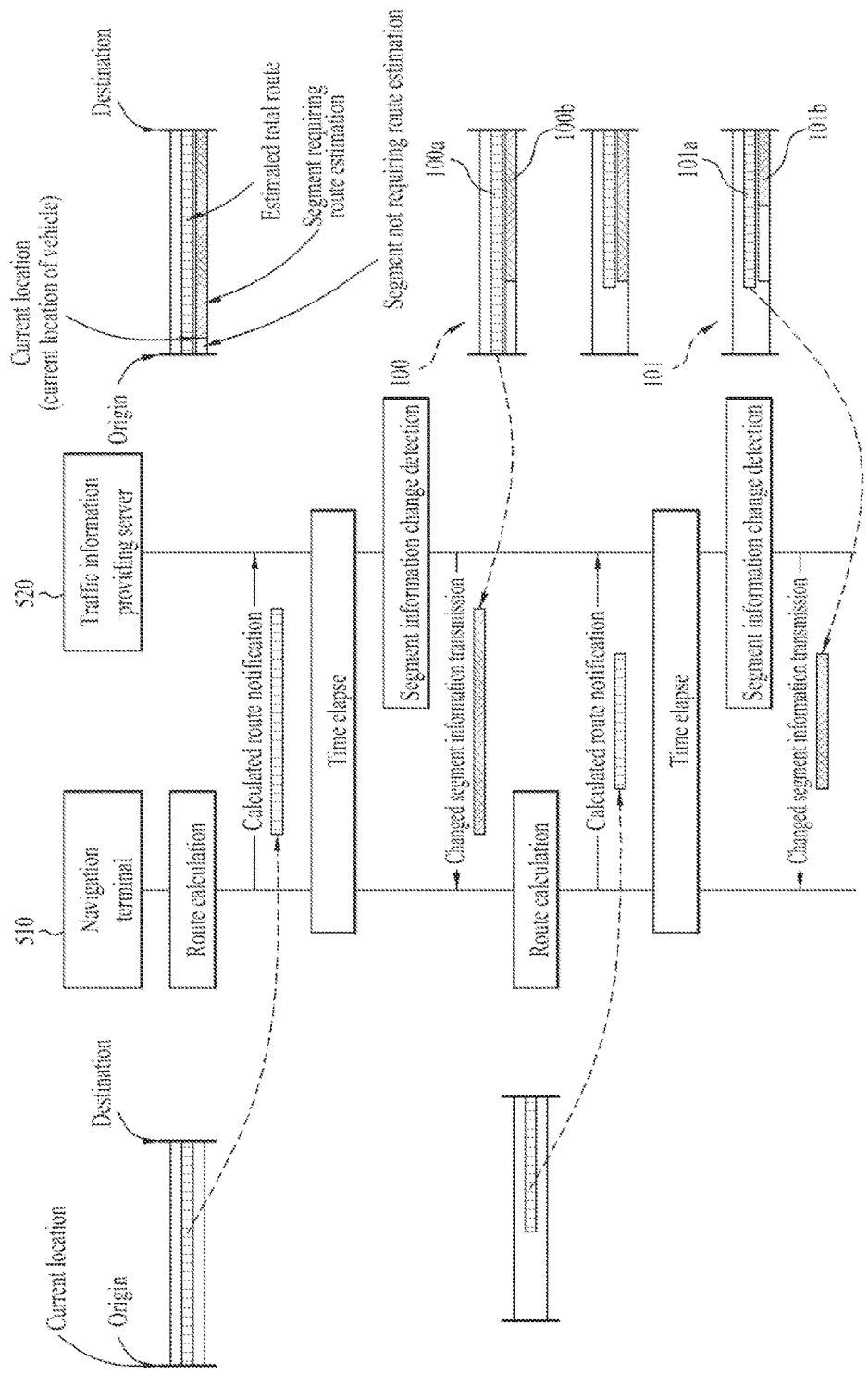
FIG. 5 illustrates a problem encountered with a conventional technology, when a server does not know the current location of an ND.
Figure 10:
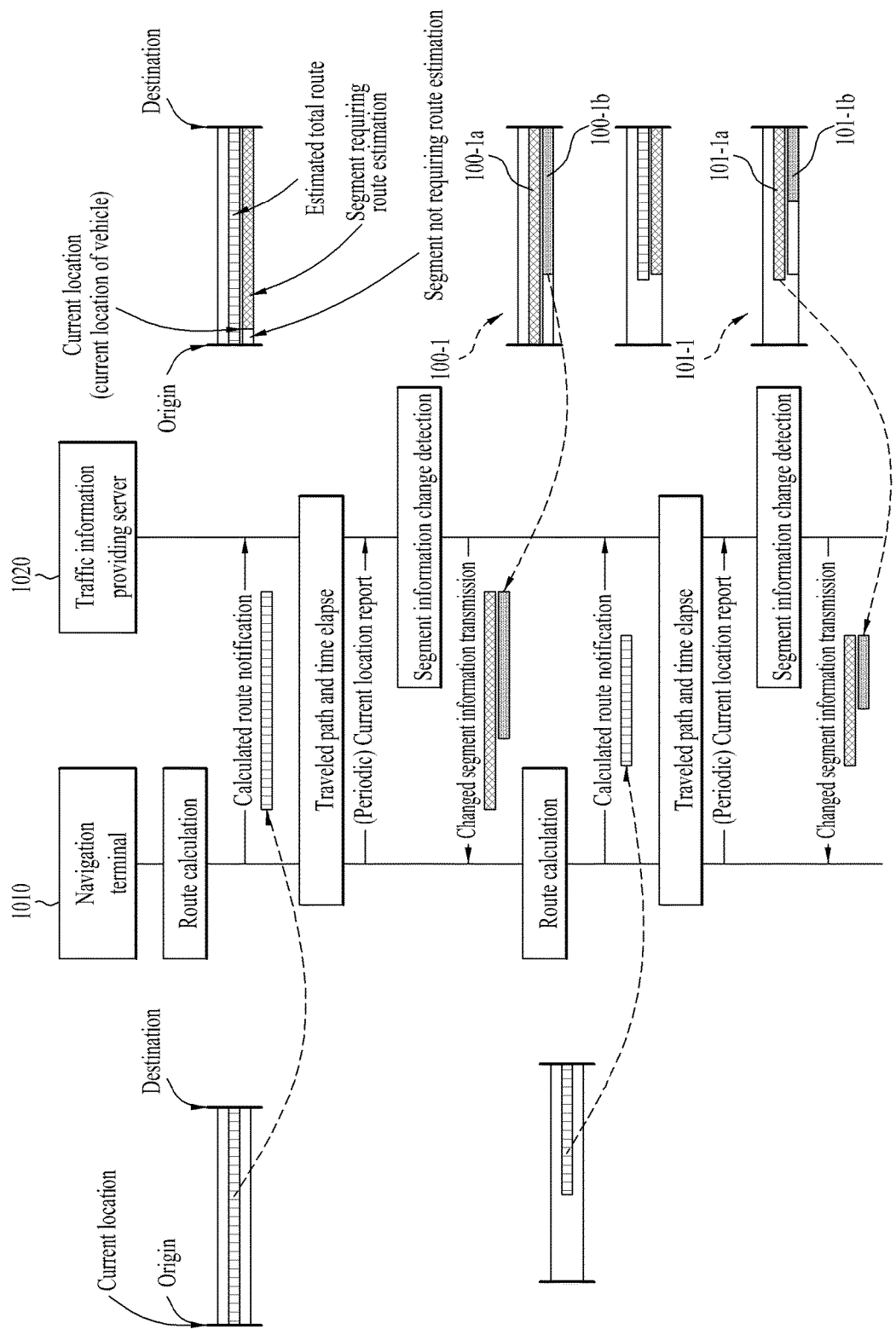
FIG. 10 illustrates an operation according to an embodiment of the present invention.

FIG. 10 illustrates operations of a terminal and a server according to an embodiment of the present invention. To overcome the afore-described problem of B), the terminal may periodically report its current location to the server. When a smart ND or a lightweight ND receives real-time traffic information, it may receive unnecessary information as illustrated in FIG. 5 in the conventional technology. In contrast, the terminal reports its current location to the server according to a specific condition and the server may reduce unnecessary resource consumption or network use using the current location of the terminal in the embodiment of the present disclosure.

The specific condition is that a vehicle to which the terminal is attached or loaded has traveled for a predetermined distance in a calculated or determined route according to the characteristics of a navigation system. For example, a condition that the terminal reports its location to the server every 2 km in a route may be imposed on the terminal.

FIG. 10 illustrates an operation of, for example, a smart ND capable of calculating a route on its own. If the terminal reports its location according to the above condition, the size of a message "carrying modified segmentation information" is reduced remarkably relative to the conventional technology that does not provide the current location of a terminal, as noted from FIG. 10.

Figure 11A:
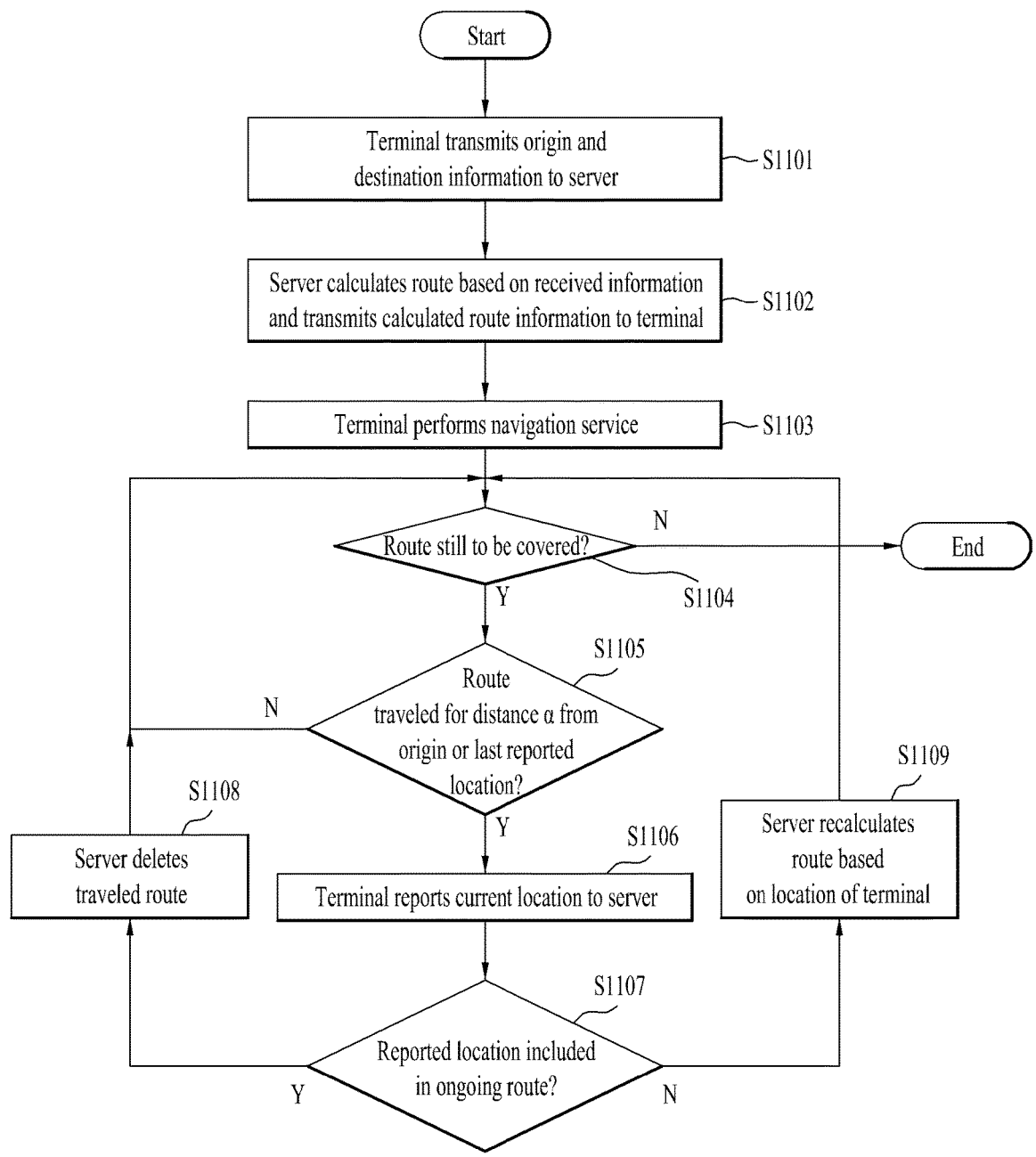
FIGS. 11A-11B are flowcharts illustrating a detailed operation according to an embodiment of the present invention.
Figure 11B:
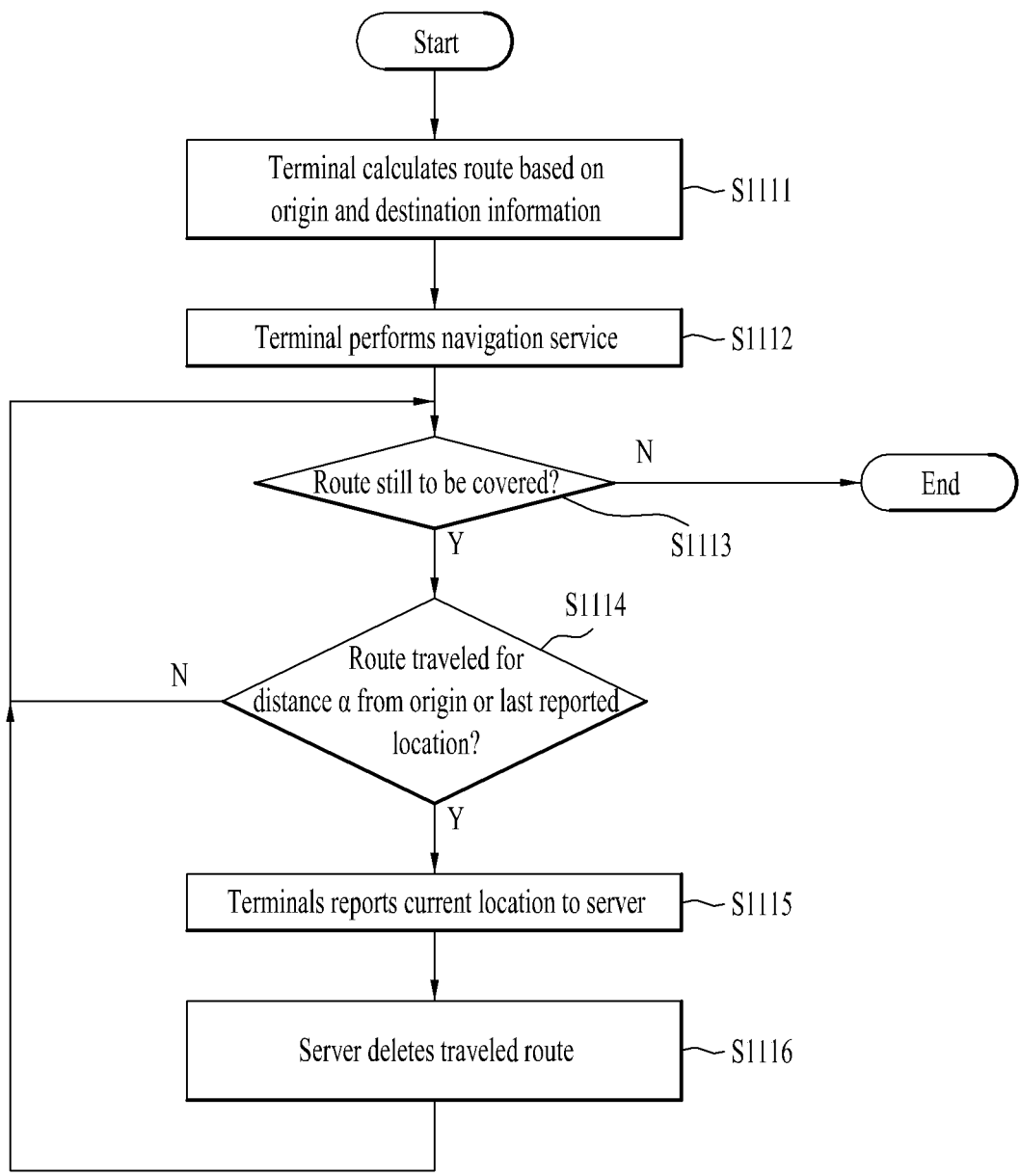

The effects of the embodiment of the present disclosure may be described conceptually with reference to FIG. 10. FIGS. 11a and 11b define a procedure for receiving information based on the current location of an ND and summarizing server-managed route information, in the cases where the ND is a lightweight ND and a smart ND, respectively.

FIG. 11a illustrates a method for summarizing server-managed route information based on a current location report of a terminal that cannot calculate a route on its own (a lightweight ND).

The terminal may transmit information about an origin and a destination to the server (S1101). A trip of the terminal or a vehicle carrying the terminal may be identified by the origin and destination information. The server may calculate a route based on the received information and transmit information about the calculated route to the terminal (S1102). Upon receipt of the information about the calculated route, the terminal may start a navigation service (S1103). The terminal may determine whether the ongoing or serviced route is still to be covered (S1104).

If the route is still to be covered in step S1104, the terminal may determine whether the terminal has traveled for a predetermined distance a from the last location reported to the server (S1105). On the other hand, if the route has been completely covered, which means that the navigation service is terminated, the procedure end. If the terminal has traveled for the predetermined distance, the terminal may transmit information about its current location to the server (S1106). In this manner, each time the terminal travels or runs for a predetermined distance in the ongoing or serviced route, the terminal may report its location to the server in steps S1104, 1105, and 1106.

Upon receipt of the information about the current location of the terminal, the server may determine whether the current location of the terminal is included in the ongoing or service route (S1107). If determining that the current location of the terminal is included in the ongoing or service route in step S1107, the server may delete the traveled route (S1108). On the contrary, if the server determines that the current location of the terminal is not included in the ongoing or service route in step S1107, the server may recalculate a route using the destination information received in step S1101 based on the current location (S1109).

The operation of FIG. 11a may be summarized as follows. It may be determined in step S1107 whether 1) the current location of the terminal indicated to the server is included in a route (segment) managed by the server or 2) the current location of the terminal indicated to the server is not included in the route (segment) managed by the server.

If condition 1) is satisfied, the server may delete the route managed (traveled) from the origin or the previous reported location to the current location, determining that the terminal has traveled normally to the current location. Consequently, transmission of unnecessary information (traffic information about an already traveled route) may be prevented during later notification of real-time traffic information. If condition 2) is satisfied, the server may recalculate a route based on the current location of the terminal, determining that the terminal went off the route.

FIG. 11b illustrates a method for reporting a current location of a terminal capable of calculating a route (a smart ND) to a server by the terminal and deleting an already traveled route by the server. The terminal may calculate a route based on information about an origin and a destination (S1111). A trip of the terminal or a vehicle carrying the terminal may be identified by the origin and destination information. The terminal may implement a navigation service along the calculated route (S1112). The terminal may determine whether the ongoing or serviced route is still to be covered (S1113).

If the route is still to be covered in step S1113, the terminal may determine whether the terminal has traveled for a predetermined distance a from the last location reported to the server (S1114). On the other hand, if the route has been completely covered, which means that the navigation service is terminated, the procedure ends. If the terminal has traveled for the predetermined distance in step S1114, the terminal may transmit information about its current location to the server (S1115). If the terminal has not traveled for the predetermined distance, the procedure returns to step S1113.

In this manner, each time the terminal travels or runs for a predetermined distance in the ongoing or serviced route, the terminal may report its location to the server in steps S1113, 1114, and 1115.

Upon receipt of the information about the current location of the terminal, the server may delete the traveled route (S1116).

According to the above-described methods illustrated in FIGS. 11a and 112b, the current location of a terminal may be periodically updated and thus the range of traffic information needed to be provided to the terminal, that is, an area or route related to a trip is reduced. Therefore, only traffic information that can be utilized in the terminal is provided to the terminal, thereby saving the storage space of the server and conserving wireless transmission and reception resources.

Figure 12:
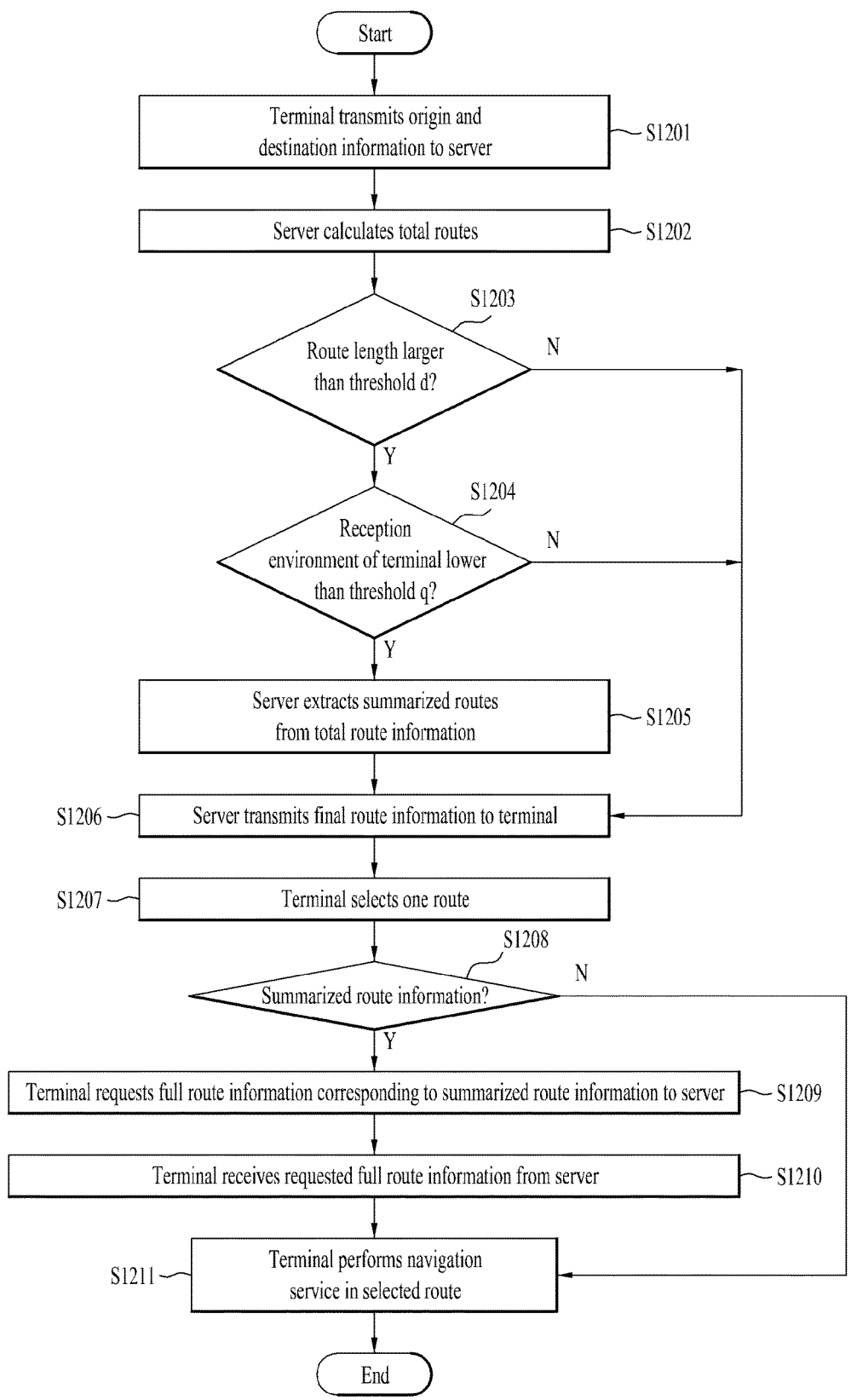
FIG. 12 is a flowchart illustrating an operation according to an embodiment of the present invention.

FIG. 12 is a flowchart illustrating an operation according to an embodiment of the present invention. The embodiment illustrated in FIG. 12 applies to a lightweight ND that cannot calculate a route. To solve the afore-described problem of C), the lightweight ND may receive route information in a full format or a summarized format according to a specific condition.

The terminal may transmit information about an origin and a destination to the server (S1201). The origin and destination information identifies a trip. The server may calculate a total route based on the received origin and destination information (S1202). The server may compare the length of the total route with a threshold d (S1203).

If the length of the total route is larger than the threshold d, the server may compare a network reception environment of the terminal with a threshold q (S1204). The network reception environment is related to the transmission rate of data that the server transmits to the terminal. The network reception environment may be called network quality. If the network reception environment is lower than the threshold q, this means that the network reception environment is relatively poor. If the network reception environment is higher than the threshold q, this means that the network reception environment is relatively good. When determining that the network reception environment of the terminal is lower than the threshold q, the server may extract a route for a summary from the calculated total route (S1205). Subsequently, the server may transmit final route information (i.e., route information in a full format or a summarized format) to the terminal (S1206).

When determining that the length of the total route is equal to or smaller than the threshold d, the procedure may go to step S1206.

Steps S1203, S1204, and S1205 may be performed for every route calculated by the server. In other words, if the server calculates N routes based on the origin and destination information received from the terminal, the server may extract N summarized routes for the N full routes in steps S1203, S1204, and S1205.

Then, the terminal or its user may select one of a plurality of routes received from the server (S1207). The route may be selected according to a subjective criterion (user preferences), an objective criterion (e.g., a route length, a travel time, etc.), or a combination of them.

If the route information transmitted by the server in step S1206 is full route information (S1208), the procedure goes to step S1211. The terminal may perform a navigation service using the received full route information (S1211).

In contrast, if the route information transmitted by the server in step S1206 is summarized route information (S1208), steps S1209 and S1210 are performed. The terminal may request full route information corresponding to the summarized route information to the server (S1209) and receive the requested full route information from the server (S1210). Subsequently, the terminal may perform the navigation service based on the full route information (S1211).

In the embodiment of the present invention described with reference to FIG. 12, the route information that the terminal receives from the server is one of two types, i.e. summarized route information (route information in a summarized format) and full route information (route information in a full format). As described before, the conditions for determining one of the two types may include a route calculated by the server, a trip length, or the network reception environment of the terminal. Further, the conditions may include the complexity of the route or the trip. The complexity of the route or the trip may be information including the number of roads (roads identified by road numbers), the number of road segments, etc. included in the calculated route of the trip.

Accordingly, the order of deciding the conditions described with reference to FIG. 12 (e.g., the length of the route is determined earlier than the reception environment of the terminal in FIG. 12) is arbitrary. All conditions may be determined simultaneously or in an order other than the order illustrated in FIG. 12. For example, if the length of a route is smaller than a threshold d1, the complexity of the route is lower than a threshold c1, and the network quality is higher than a threshold q1, the server may transmit full route information (i.e., route information in a full format) to the terminal.

The basis on which the above conditions are used is that if the length of the calculated route is smaller than the threshold d1, summarized route information may not be useful to the navigation service. For example, if the length of the calculated route is smaller than the threshold d, the number of routes that can be calculated by the server may be small and the calculated routes may be relatively simple. Therefore, summarizing a small number of non-useful, short, and simple routes may increase the route computation load of the server. Moreover, transmission of the non-useful summarized route information may cause network resource waste. The embodiment of the present invention illustrated in FIG. 12 may overcome these problems.

Figure 13:
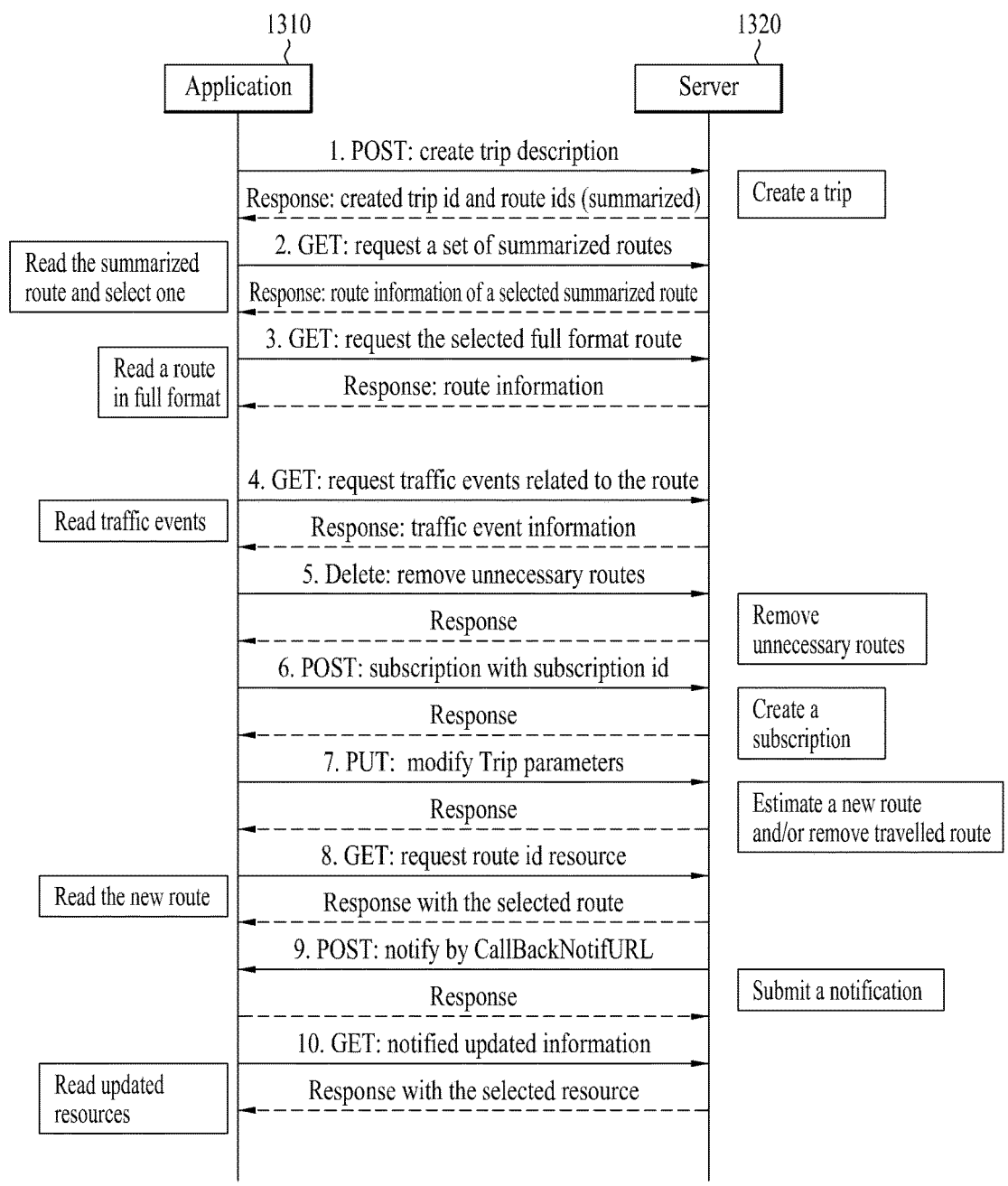
FIG. 13 is a flowchart illustrating a detailed operation according to an embodiment of the present invention.
Figure 14:
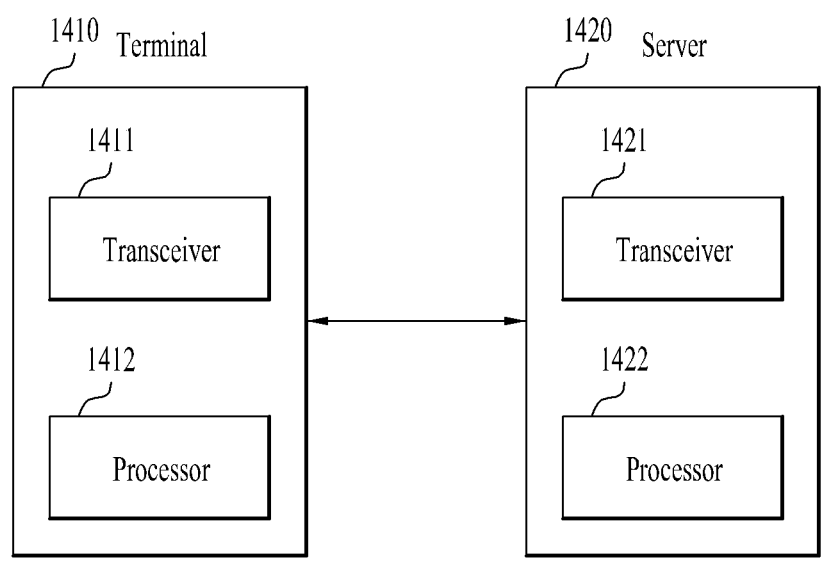
FIG. 14 is a block diagram of an apparatus that can implement embodiments of the present invention.

FIG. 13 is a flowchart illustrating a detailed operation according to an embodiment of the present invention. An application 1310 corresponds to a DynNav application as described before and may be referred to as a "terminal". Therefore, the application will be called the terminal in the description of FIG. 13. In addition, a server 1320 corresponds to a DynNav server as described before.

1. POST: Create Trip Description

The terminal 1310 may create a trip description based on trip parameters defined by a user of the terminal 1310, that is, information about an origin and a destination, using a POST command. The server 1320 may calculate a set of routes for a trip using related traffic information in response of the creation of the trip description and may reply to the terminal 1310 with a representation of "trip" resources including IDs of the calculated routes.

2. GET: Request a Set of Summarized Routes

The terminal may access a set of summarized routes using a GET command based on performance parameters regarding main road segments of the routes. This step may be repeated for all routes calculated by the server. However, if the length and complexity of the trip are limited and the network quality is appropriate, full route information may have already been requested in this step.

3. GET: Request the Selected Full Format Route

The terminal or its user may select one of the calculated routes and access full route information about the selected route using a GET command. If full-format routes are used, this step is not performed.

4. GET: Request Traffic Events Related to the Route

The terminal may access traffic events under selected categories in relation to an ongoing route using links to traffic event resources provided by the route representation, using a GET command. The access to the traffic events may be limited to the categories selected by the user. The categories refer to, for example, types of traffic events like traffic accident and road work.

5. DELETE: Remove Unnecessary Routes

The terminal may delete unnecessary routes that have been calculated by the server but not selected by the user, using a DELETE command.

6. POST: Subscription with Subscription id

The terminal may subscribe to a notification service for the trip, using a POST command. The server may notify the terminal of the following events:

a. updates of performance parameters and new traffic events (limited to a selected category) for all routes related to the trip;

b. alternative routes in case of traffic congestion in the existing routes.

7. PUT: Modify Trip Parameters

If the vehicle carrying the terminal gets out of the current route(s) or bypasses the current route(s), the terminal may modify an origin parameter in the trip resources using a PUT operation. The server may calculate a new route based on a new origin, determining that the current location of the terminal is not included in the current route. The server may delete the existing route and may respond to the PUT operation using the ID of the new route included in the trip representation. If the changed origin parameter used in the PUT operation is included in the route(s), the server uses this information to delete already traveled segments from the route(s) representation.

This step (the PUT operation for the trip resources) takes place when the vehicle carrying the terminal gets out of or bypasses a route, the vehicle travels for a predetermined distance from a previous reported location, and/or the vehicle enters a segment for which the server has requested a location update.

8. GET: Request Route id Resource

Because the terminal subscribed to the notification service for the trip resource, the subscription includes all routes related to the trip, and the server will transmit a notification of new events affecting the new route, the terminal may access the new calculated route along with performance parameters and traffic events by a GET operation.

9. POST: Notify by CallBackNotifURL

Upon detection of traffic events and/or heavy congestion and/or a change in the location of a third party along the proposed routes, the server may notify the terminal availability of updated information about the current route and an alternative route by a POST command 10. GET: Notified Updated Information The subscription to the notification service includes all routes related to the trip and a notification will expand to the alternative route. Therefore, the terminal may access updated information about the current route by a GET command and read the alternative route by a GET command. If the location of the third party has been changed, the terminal may access new location information about the third party available in the trip resource and an updated route resource by a GET command.

FIG. 13 is a block diagram of an apparatus that can implement embodiments of the present invention. A terminal 1410 may include a transceiver 1411 configured to communicate with a server 1420 and a processor 1412 configured to calculate a route using traffic information received from the server 1420. The server 1420 may include a transceiver 1421 configured to communicate with the terminal 1410 and a processor 1422 configured to calculate a route based on a parameter related to a trip, such as information about an origin and a destination received from the terminal 1410 or collect and process traffic information.

In an embodiment of the present invention that will be described with reference to FIG. 13, the terminal 1410 is a smart ND. In this embodiment, the processor 1412 may be configured to request traffic information related to a trip to the server, control the transceiver 1411 to receive the traffic information related to the trip from the server, and calculate a route using the received traffic information. In an embodiment of the present invention, before the terminal calculates a route, the terminal may receive the traffic information from the server so that the terminal may use real-time traffic information in calculating an initial route.

The received traffic information may include a traffic event corresponding information about obstacles to a traffic flow in an area or route related to the trip and a performance parameter corresponding to traffic flow information about road segments within a predetermined radius from the origin of the trip. The reason for requesting traffic information to the server by the terminal before route calculation is to provide real-time traffic information for initial route calculation of the terminal. Without such prior traffic information, the terminal has no choice but to check whether a plurality of routes initially calculated by the terminal are optimized by transmitting route information to the server a plurality of times. In addition, a geographical range is limited only for a performance parameter, for fast route calculation in light of a larger amount of data of the performance parameter than a traffic event. Considering the limit and rapidness of network resources, real-time traffic information changes over time. Therefore, a performance parameter for a remote place from the origin may not be effective at the time when the vehicle carrying the terminal passes through an area or route related to the performance parameter. In this context, the geographical range is confined for the performance parameter in order to prevent collection or transmission of unnecessary data.

In the presence of congestion equal to or heavier than a predetermined level within a predetermined radius from the origin, the server may transmit the performance parameter to the terminal.

The traffic event may include an event such as a road work or an accident related to the area or router. The performance parameter may include at least one of the speed, congestion, and travel time of the road segment.

The processor 1412 may be configured to request the traffic information related to the trip to the server using boolean-type data.

An embodiment in which the terminal 1410 is a lightweight ND will be described with reference to FIG. 13. In this embodiment, the processor 1412 is configured to request a set of routes for the trip calculated by the server to the server and control the transceiver 1411 to receive information about the requested set of routes. The information about the requested set of routes may be summarized route information or full route information.

In the case where the server provides summarized route information to the terminal in the conventional technology, the summarized route information is unnecessary under a specific condition. Thus, two types of route information are provided to the terminal. The specific condition may be related to at least one of the length and complexity of a route and the quality of a network environment between the terminal and the server. For example, if the length of the route is smaller than a predetermined length, the route information has a small amount of data. Therefore, if the server transmits summarized route information to the terminal, network resources or the computation capability of the service is wasted.

Accordingly, the information about the requested set of routes may be provided as summarized route information or full route information based on at least one of the length and complexity of the routes and the quality of the network environment between the terminal and the server.

If the length and complexity of the routes are smaller than a predetermined length and complexity and the network environment is better than a predetermined quality, the terminal may receive full route information about the set of routes from the server.

Upon receipt of summarized route information about the set of routes from the server, the processor 1412 may request full route information about a route selected from the set of routes to the server. Then the processor 1412 may control the transceiver 1411 to receive the full route information about the selected route from the server.

INDUSTRIAL APPLICABILITY

The embodiments of the present invention are applicable to an ND or a server.

The invention claimed is:

1. A method for acquiring a route for a trip identified by an origin and a destination from a server at a terminal, the method comprising:
   requesting, by the terminal, a set of routes for the trip calculated by the server to the server; and
   receiving, by the terminal from the server, the requested set of routes,
   wherein the requested set of routes includes a plurality of routes, and a respective route of the plurality of routes is provided as a summarized format route if a condition for the respective route is not satisfied, and as a full format route if the condition is satisfied, and
   wherein the condition is that a length and complexity of the respective route are shorter and lower than a predetermined length and a predetermined complexity respectively, and a quality of a network environment for the terminal is better than a predetermined quality.

2. The method according to claim 1, further comprising:
   requesting a full format route corresponding to the summarized format route to the server when the summarized format route is selected from the requested set of routes.

3. A terminal for acquiring a route for a trip identified by an origin and a destination from a server, the terminal comprising:
   a transceiver configured to communicate with the server; and
   a processor configured to:
      request a set of routes for the trip calculated by the server to the server, and
      control the transceiver to receive the requested set of routes from the server,
   wherein the requested set of routes includes a plurality of routes, and a respective route of the plurality of routes is provided as a summarized format route if a condition for the respective route is not satisfied, and as a full format route if the condition is satisfied, and
   wherein the condition is that a length and complexity of the respective route are shorter and lower than a predetermined length and a predetermined complexity respectively, and a quality of a network environment for the terminal is better than a predetermined quality.

4. The terminal according to claim 3, wherein the processor is configured to request a full format route corresponding to the summarized format route to the server when the summarized format route is selected from the requested set of routes.

5. A server for calculating a route for a trip identified by an origin and a destination, the server comprising:
   a transceiver configured to communicate with a terminal; and
   a processor configured to:
      receive a request for a set of routes for the trip from the terminal,
      calculate a plurality of routes for the trip according to the request,
      transmit the calculated plurality of routes to the server,
      calculate a full format route corresponding to each of the plurality of routes,
      calculate a summarized format route corresponding to at least one specific route of the plurality of routes if a condition for the at least one specific route is satisfied, and
      transmit, to the terminal, the calculated summarized format route for the at least one specific route, and the full format route for each route other than the at least one specific route as the calculated plurality of routes,
   wherein the condition is that a length and complexity of at least one specific route are shorter and lower than a predetermined length and a predetermined complexity respectively, and a quality of a network environment for the terminal is better than a predetermined quality.

* * * * *